United States Patent
Jeon et al.

(10) Patent No.: US 10,496,864 B2
(45) Date of Patent: Dec. 3, 2019

(54) FINGERPRINT SENSOR AND ELECTRONIC DEVICE HAVING THE SAME

(71) Applicant: Samsung Electronics Co., Ltd., Suwon-si, Gyeonggi-do (KR)

(72) Inventors: Jin-Uk Jeon, Ansan-si (KR); Sun-Kwon Kim, Yongin-si (KR); Seung-Hoon Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 140 days.

(21) Appl. No.: 15/439,111

(22) Filed: Feb. 22, 2017

(65) Prior Publication Data
US 2017/0270333 A1 Sep. 21, 2017

(30) Foreign Application Priority Data
Mar. 17, 2016 (KR) .................. 10-2016-0031874

(51) Int. Cl.
*G06K 9/00* (2006.01)

(52) U.S. Cl.
CPC .......... *G06K 9/0002* (2013.01); *G06K 9/001* (2013.01)

(58) Field of Classification Search
CPC ........ H04N 5/378; H04N 5/243; H04N 5/335; H04N 5/3741; H04N 5/3745; H04N 9/045; G06K 9/0002; G06K 9/001; G06K 9/00006; G06K 9/00067; G06F 3/044; G06F 2203/04105; G06F 2203/04108; G06F 3/0304; G06F 3/041; G06F 3/0416
See application file for complete search history.

(56) References Cited

U.S. PATENT DOCUMENTS

| | | | |
|---|---|---|---|
| 7,256,724 B2 | 8/2007 | Lee | |
| 7,471,230 B2 | 12/2008 | Tooyama et al. | |
| 8,390,486 B2 | 3/2013 | Wang et al. | |
| 8,624,769 B2 | 1/2014 | Wrigley et al. | |
| 2004/0051791 A1* | 3/2004 | Hashimoto | G06K 9/00013 348/226.1 |
| 2008/0170137 A1* | 7/2008 | Matsumoto | H04N 5/347 348/241 |
| 2014/0027606 A1 | 1/2014 | Raynor et al. | |
| 2014/0146210 A1 | 5/2014 | Lee et al. | |

FOREIGN PATENT DOCUMENTS

JP 2010154396 A 7/2010

* cited by examiner

*Primary Examiner* — Kim Y Vu
*Assistant Examiner* — Michael J Vanchy, Jr.
(74) *Attorney, Agent, or Firm* — Harness, Dickey & Pierce, P.L.C.

(57) ABSTRACT

A fingerprint sensor includes a pixel array, an analog-to-digital converter, and a reference signal generator. The pixel array includes a plurality of unit pixels arranged in rows and columns, and each of the plurality of unit pixels generates an analog signal by detecting a fingerprint of a user. The analog-to-digital converter performs an analog-to-digital conversion operation on the analog signal to generate a digital signal. The analog-to-digital converter is configured to perform the analog-to-digital conversion based on a reference signal. The reference signal generator generates the reference signal such that the reference signal decreases at a first rate from a start voltage, and adjusts a magnitude of the start voltage based on the digital signal.

11 Claims, 12 Drawing Sheets

FINGERPRINT SENSOR AND ELECTRONIC DEVICE HAVING THE SAME

CROSS-REFERENCE TO RELATED APPLICATION(S)

This application claims priority under 35 U.S.C. § 119 to Korean Patent Application No. 10-2016-0031874, filed on Mar. 17, 2016 in the Korean Intellectual Property Office (KIPO), the contents of which are herein incorporated by reference in their entirety.

BACKGROUND

1. Technical Field

Example embodiments relate to a fingerprint sensor.

2. Description of the Related Art

Generally, a fingerprint sensor obtains a fingerprint image of a finger by detecting a capacitance between a sensing electrode and a finger. For example, a fingerprint sensor may obtain a fingerprint image of a finger based on a capacitance between the finger and a sensing electrode included in a pixel on which a ridge of a fingerprint is located and a capacitance between the finger and a sensing electrode included in a pixel on which a valley of the fingerprint is located.

SUMMARY

Since a difference between a capacitance between the finger and a sensing electrode included in a pixel on which a ridge of a fingerprint is located and a capacitance between the finger and a sensing electrode included in a pixel on which a valley of the fingerprint is located is very small, a difference between a magnitude of the analog signal generated by the pixel on which a ridge of the fingerprint is located and a magnitude of the analog signal generated by the pixel on which a valley of the fingerprint is located may be also very small.

Example embodiments a fingerprint sensor having an increased resolution to generate digital data representing a fingerprint pattern more accurately using the analog signals generated by the pixels.

Some example embodiments are directed to provide a fingerprint sensor having a high resolution.

Some example embodiments are directed to provide an electronic device including the fingerprint sensor.

According to at least some example embodiments, a fingerprint sensor includes a pixel array, an analog-to-digital converter, and a reference signal generator. The pixel array includes a plurality of unit pixels arranged in rows and columns, and each of the plurality of unit pixels generates an analog signal by detecting a fingerprint of a user. The analog-to-digital converter performs an analog-to-digital conversion operation on the analog signal to generate a digital signal. The analog-to-digital converter is configured to perform the analog-to-digital conversion based on a reference signal. The reference signal generator generates the reference signal such that the reference signal decreases at a first rate from a start voltage, and adjusts a magnitude of the start voltage based on the digital signal.

According to at least some example embodiments, an electronic device includes a fingerprint sensor and an application processor. The fingerprint sensor includes a plurality of unit pixels, each of the plurality of unit pixels is configured to generate an analog signal by detecting a fingerprint of a user. The fingerprint sensor is configured to perform an analog-to-digital conversion operation on the analog signal to generate a digital signal, the analog-to-digital conversion being based on a reference signal that decreases at a first rate from a start voltage, and the fingerprint sensor is configured to adjust a magnitude of the start voltage based on the digital signal and a magnitude of the first rate based on the digital signal. The application processor authenticates the user based on the digital signal.

According to at least some example embodiments, a sensor includes a pixel array including a plurality of pixels and an analog-to-digital converter (ADC). A first selected pixel is configured to generate a pixel voltage. The ADC is configured to first compare the pixel voltage to a first reference voltage in a first time interval and second compare the pixel voltage to a second reference voltage in a second time interval, the ADC configured to generate a digital signal based on the first and second comparisons. The first reference voltage and the second reference voltage are different.

BRIEF DESCRIPTION OF THE DRAWINGS

Illustrative, non-limiting example embodiments will be more clearly understood from the following detailed description in conjunction with the accompanying drawings.

DETAILED DESCRIPTION OF EXAMPLE EMBODIMENTS

Figure 1:
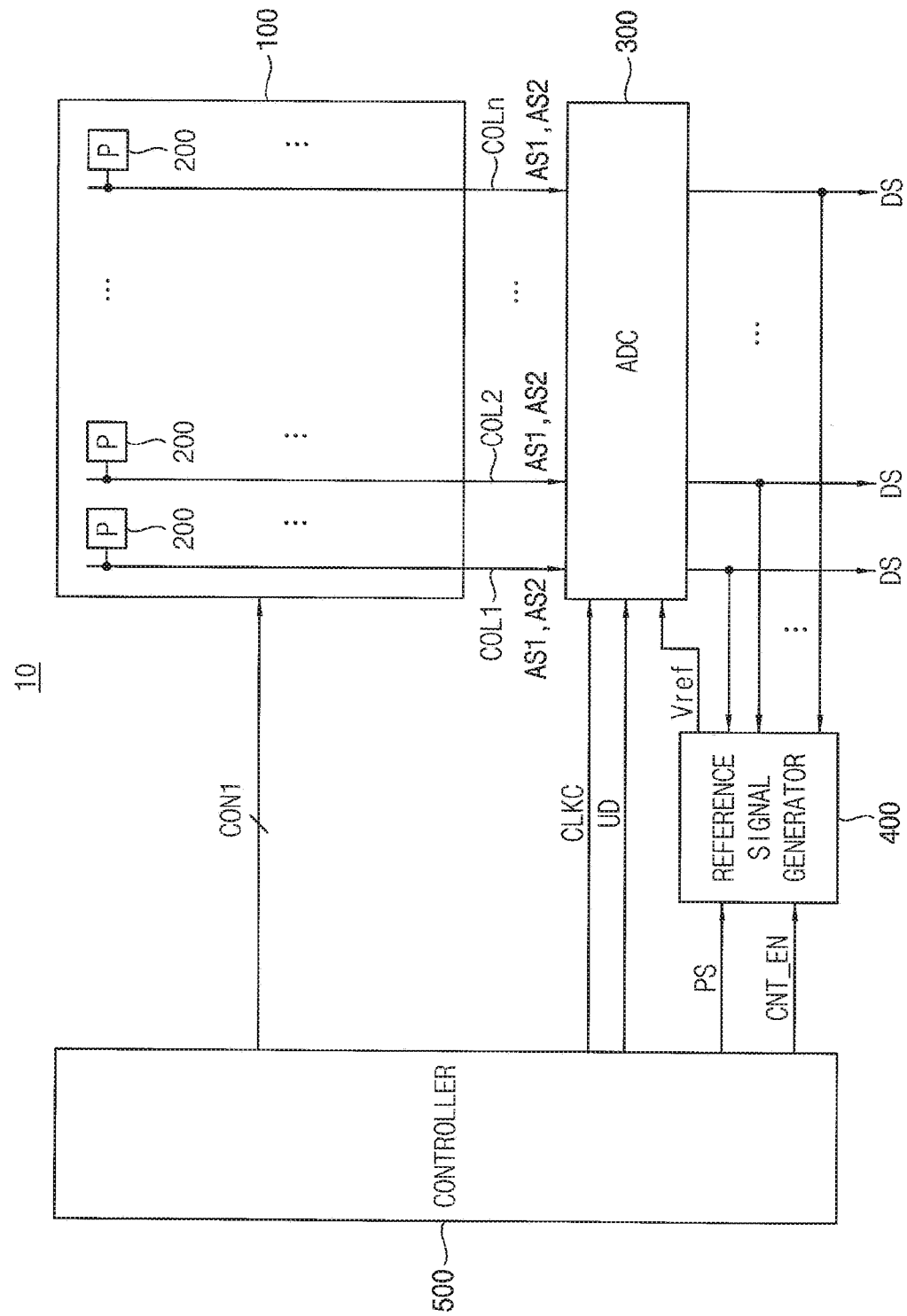
FIG. 1 is a block diagram illustrating a fingerprint sensor according to example embodiments.

FIG. 1 is a block diagram illustrating a fingerprint sensor according to example embodiments.

Referring to FIG. 1, a fingerprint sensor 10 includes a pixel array 100, an analog-to-digital converter ADC 300, a reference signal generator 400, and a controller 500.

The controller 500 may be implemented in hardware, a processor configured to execute software, firmware, or any combination thereof, for example. When the controller 500 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the controller 500. CPUs, DSPs, ASICs and FPGAs may generally be referred to as processing devices.

In the event where the controller 500 is a processor executing software, the processor is configured as a special purpose machine to execute the software, stored in a storage medium, to perform the functions of the controller 500. In such an embodiment, the processor may include one or more Central Processing Units (CPUs), digital signal processors (DSPs), application-specific-integrated-circuits (ASICs), field programmable gate arrays (FPGAs) computers.

The pixel array 100 may include a plurality of unit pixels P 200 arranged in rows and columns. A plurality of column lines COL1, COL2, . . . , COLn may be formed on the pixel array 100 in a column direction. The unit pixels 200 arranged in a same column may be coupled to a same column line COLk. Here, n represents a positive integer, and k represents a positive integer equal to or smaller than n.

The controller 500 may control an operation of the pixel array 100 in a unit of a row using control signals CON1.

When a finger contacts on the pixel array 100, each of the plurality of unit pixels 200 included in the pixel array 100 may generate an analog signal by detecting a fingerprint pattern of the finger. In some example embodiments, each of the plurality of unit pixels 200 may output a first analog signal AS1, which corresponds to a reset element, and a second analog signal AS2, which corresponds to a fingerprint of the finger, alternately through the plurality of column lines COL1, COL2, . . . , COLn in a unit of a row.

Figure 2:
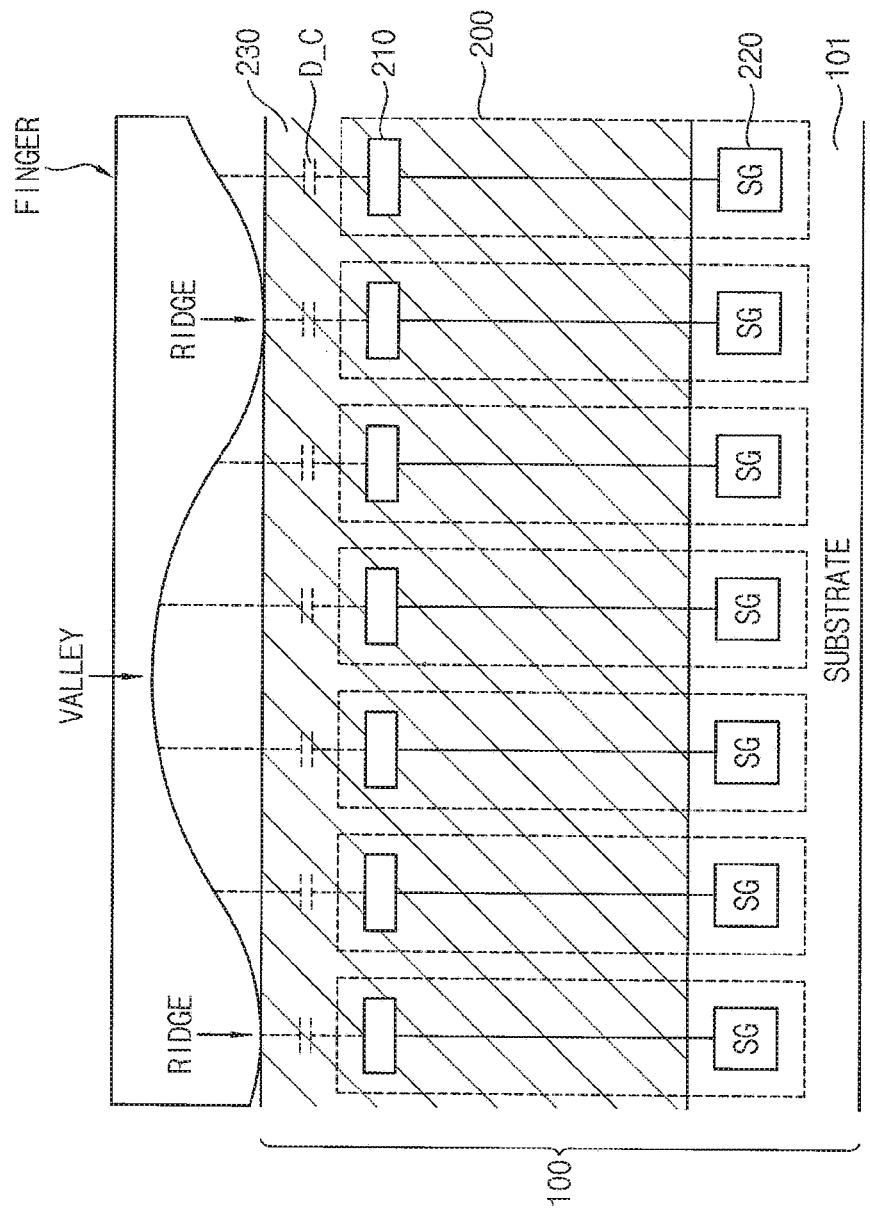
FIG. 2 is a cross-sectional view illustrating an example of a pixel array included in the fingerprint sensor of FIG. 1.

FIG. 2 is a cross-sectional view illustrating an example of a pixel array included in the fingerprint sensor of FIG. 1.

Referring to FIG. 2, each of the plurality of unit pixels 200 included in the pixel array 100 may include a sensing electrode 210, which is formed above a semiconductor substrate 101, and a signal generation circuit SG 220, which is formed on the semiconductor substrate 101. The sensing electrode 210 included in each of the plurality of unit pixels 200 may be electrically connected to the corresponding signal generation circuit 220.

In some example embodiments, the sensing electrode 210 may be implemented as a metal plate including a metal material.

The pixel array 100 may further include an insulation layer 230, which is formed above the semiconductor substrate 101 and covers the sensing electrode 210 of each of the plurality of unit pixels 200. In some example embodiments, at least a portion of the insulation layer 230 formed above the sensing electrode 210 may include glass.

FIG. 2 represents a state when a finger is on the insulation layer 230 included in the pixel array 100.

When the finger contacts on the pixel array 100, the finger may operate as an electrode. Therefore, the sensing electrode 210 included in each of the plurality of unit pixels 200 may form a detection capacitor D_C together with the finger.

Generally, a fingerprint of a person has an intrinsic pattern formed by a ridge and a valley.

Therefore, as illustrated in FIG. 2, a distance between the finger and the sensing electrode 210 included in the unit pixel 200 on which a ridge of the fingerprint is located may be smaller than a distance between the finger and the sensing electrode 210 included in the unit pixel 200 on which a valley of the fingerprint is located.

Since a capacitance of a capacitor is inversely proportional to a distance between two electrode of the capacitor, a capacitance of the detection capacitor D_C formed by the sensing electrode 210 included in the unit pixel 200 on which a ridge of the fingerprint is located may be greater than a capacitance of the detection capacitor D_C formed by the sensing electrode 210 included in the unit pixel 200 on which a valley of the fingerprint is located.

The signal generation circuit 220 included in each of the plurality of unit pixels 200 may generate the first analog signal AS1 representing the reset element and the second analog signal AS2 having a magnitude determined based on a capacitance of the detection capacitor D_C formed by the corresponding sensing electrode 210 and the finger.

Figure 3:
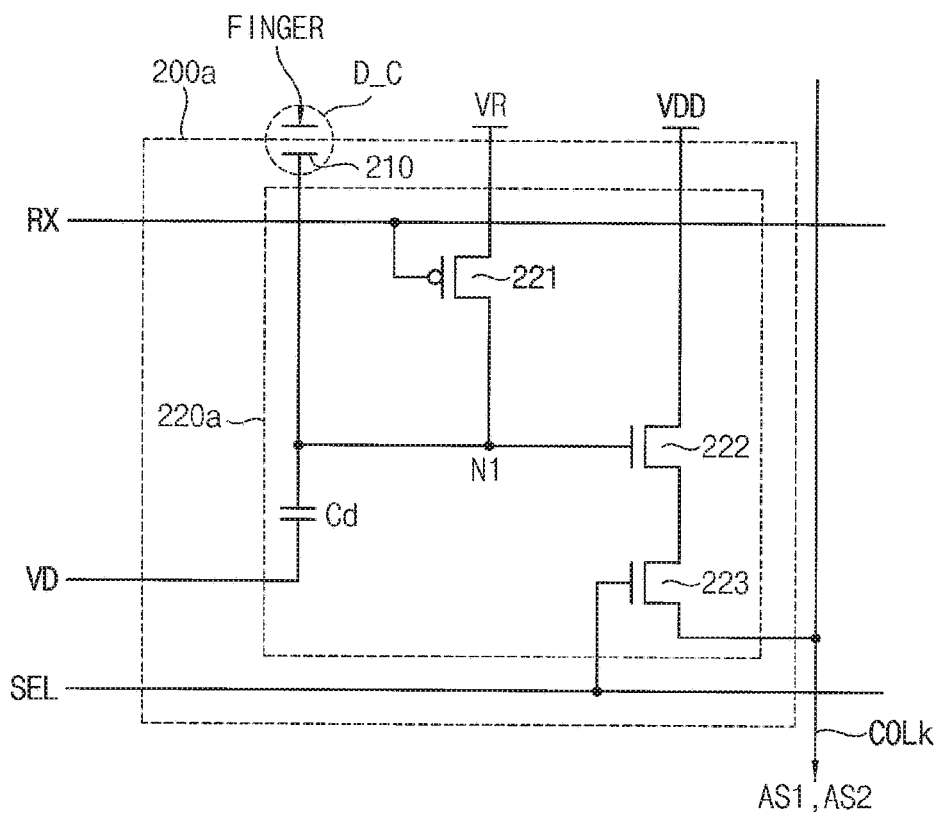
FIG. 3 is a circuit diagram illustrating an example of a unit pixel included in the fingerprint sensor of FIG. 1.

FIG. 3 is a circuit diagram illustrating an example of a unit pixel included in the fingerprint sensor of FIG. 1.

Each of the plurality of unit pixels 200 included in the pixel array 100 of FIG. 1 may be implemented with a unit pixel 200a of FIG. 3.

When each of the plurality of unit pixels 200 included in the pixel array 100 of FIG. 1 is implemented with the unit pixel 200a of FIG. 3, the control signals CON1, which are provided by the controller 500 to each of the plurality of unit pixels 200a, may include a drive voltage VD, a reset control signal RX, and a row selection signal SEL.

Referring to FIG. 3, the unit pixel 200a may include a sensing electrode 210 and a signal generation circuit 220a.

As illustrated in FIG. 3, the sensing electrode 210 included in the unit pixel 200a may form the detection capacitor D_C together with the finger contacted on the pixel array 100.

The signal generation circuit 220a may include a reset transistor 221, a drive transistor 222, a row selection transistor 223, and a drive capacitor Cd.

The drive capacitor Cd may include a first electrode receiving the drive voltage VD from the controller 500 and a second electrode coupled to a first node N1. The first node N1 may be coupled to the sensing electrode 210. Therefore, when a voltage level of the drive voltage VD is changed, a detection voltage formed at the first node N1 may be determined based on a ratio of the capacitance of the detection capacitor D_C, which is formed by the sensing electrode 210 and the finger contacted on the pixel array 100, to a capacitance of the drive capacitor Cd.

The reset transistor 221 may include a source coupled to a reset voltage VR, a drain coupled to the first node N1, and a gate receiving the reset control signal RX provided by the controller 500. When the reset transistor 221 is turned on in response to the reset control signal RX, the detection voltage formed at the first node N1 may be reset to the reset voltage VR.

The drive transistor 222 may include a source coupled to a drain of the row selection transistor 223, a drain coupled to a supply voltage VDD, and a gate coupled to the first node N1. The drive transistor 222 may generate an analog signal having a magnitude determined based on a voltage level of the detection voltage formed at the first node N1.

The row selection transistor 223 may include a drain coupled to the source of the drive transistor 222, a gate receiving the row selection signal SEL provided by the controller 500, and a source coupled to the corresponding column line COLk.

When the row selection transistor 223 is turned on in response to the row selection signal SEL, the analog signal generated by the drive transistor 222 may be provided to the analog-to-digital converter 300 through the corresponding column line COLk as the first analog signal AS1 and the second analog signal AS2.

On the other hand, when the row selection transistor 223 is turned off in response to the row selection signal SEL, the signal generation circuit 220a may be disconnected from the corresponding column line COLk.

In some example embodiments, the reset transistor 221 may be a p-type metal oxide semiconductor (PMOS) transistor, and each of the drive transistor 222 and the row selection transistor 223 may be an n-type metal oxide semiconductor (NMOS) transistor.

Figure 4:
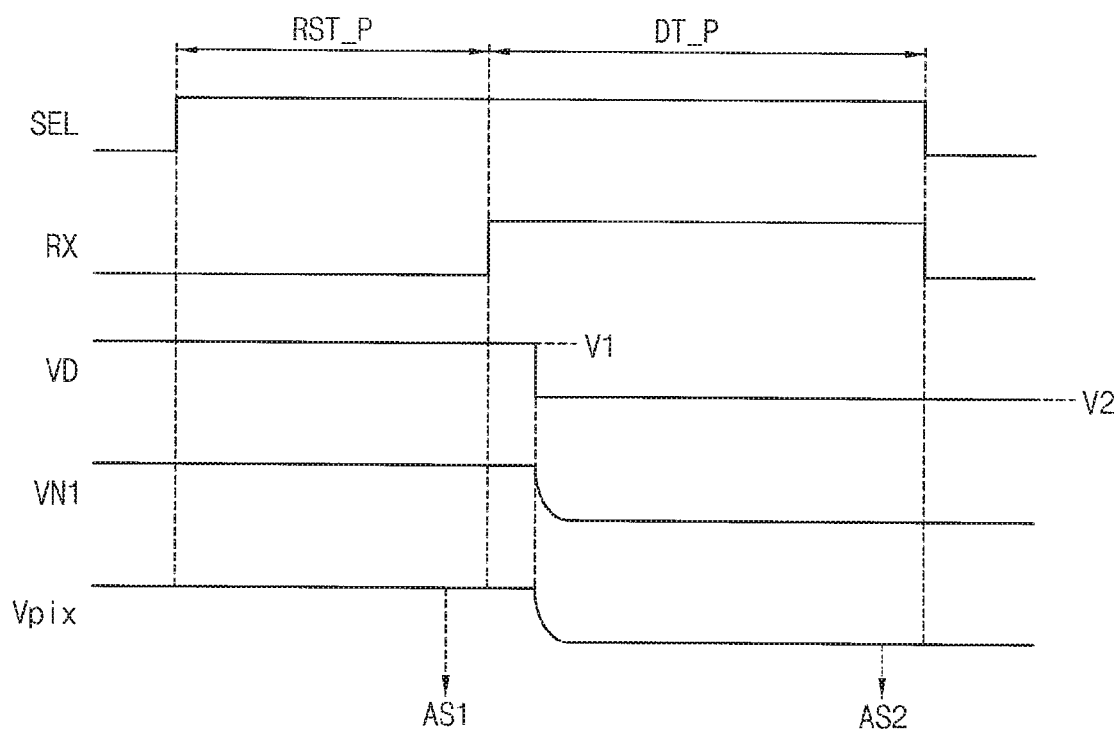
FIG. 4 is a timing diagram for describing an operation of the unit pixel of FIG. 3.

FIG. 4 is a timing diagram for describing an operation of the unit pixel of FIG. 3.

Hereinafter, an operation of the pixel array 100 will be described with reference to FIGS. 1 to 4 when the pixel array 100 includes the unit pixel 200a of FIG. 3.

When a finger contacts on the pixel array 100, the controller 500 may determine one of the rows included in the pixel array 100 as a selected row and determine the rest of the rows except for the selected row as unselected rows.

The controller 500 may provide the row selection signal SEL inactivated in a logic low level to each of unselected unit pixels 200a included in the unselected rows. Therefore, the row selection transistor 223 included in each of the unselected unit pixels 200a may be turned off, such that the signal generation circuit 220a included in each of the unselected unit pixels 200a may be disconnected from the corresponding column line COLk.

In addition, the controller 500 may provide the row selection signal SEL activated in a logic high level to each of selected unit pixels 200a included in the selected row. Therefore, the row selection transistor 223 included in the selected unit pixel 200a may be turned on, such that the signal generation circuit 220a included in the selected unit pixel 200a may be coupled to the corresponding column line COLk.

As illustrated in FIG. 4, the activated period of the row selection signal SEL may be divided into a reset period RST_P and a detection period DT_P.

Referring to FIG. 4, the controller 500 may provide the reset control signal RX activated in a logic low level to the selected unit pixel 200a during the reset period RST_P. In addition, the controller 500 may provide the drive voltage VD having a first voltage level V1 to the selected unit pixel 200a during the reset period RST_P.

Since the reset transistor 221 included in the selected unit pixel 200a is turned on in response to the reset control signal RX activated in the logic low level, the detection voltage VN1 formed at the first node N1, which is coupled to the sensing electrode 210 of the selected unit pixel 200a, may be reset to the reset voltage VR and charges corresponding to a voltage difference between the reset voltage VR and the drive voltage VD may be charged in the drive capacitor Cd during the reset period RST_P.

Since the gate of the drive transistor 222 receives the detection voltage VN1 formed at the first node N1, the reset voltage VR may be provided to the gate of the drive transistor 222. Therefore, the signal generation circuit 220a included in the selected unit pixel 200a may output a pixel signal Vpix corresponding to the reset voltage VR through the drive transistor 222 and the row selection transistor 223 as the first analog signal AS1 during the reset period RST_P.

After that, the controller 500 may provide the reset control signal RX inactivated in the logic high level to the selected unit pixel 200a during the detection period DT_P. Since the reset transistor 221 included in the selected unit pixel 200a is turned off in response to the reset control signal RX inactivated in the logic high level, the sensing electrode 210 of the selected unit pixel 200a may be floated during the detection period DT_P.

After that, the controller 500 may provide the drive voltage VD having a second voltage level V2 lower than the first voltage level V1 to the selected unit pixel 200a. Therefore, as illustrated in FIG. 4, the detection voltage VN1 formed at the first node N1 of the selected unit pixel 200a may decrease based on a ratio of the capacitance of the detection capacitor D_C, which is formed by the sensing electrode 210 and the finger contacted on the pixel array 100, to the capacitance of the drive capacitor Cd.

Since the gate of the drive transistor 222 receives the detection voltage VN1 formed at the first node N1, the signal generation circuit 220a included in the selected unit pixel 200a may output the pixel signal Vpix corresponding to a voltage level of the detection voltage VN1 through the drive transistor 222 and the row selection transistor 223 as the second analog signal AS2 during the detection period DT_P.

After that, the controller 500 may consecutively select each of the rows included in the pixel array 100 by moving in a unit of a row to determine the selected row, and repeatedly perform the operation described above with reference to FIG. 4 on the selected row, such that the pixel array 100 may output the first analog signal AS1 and the second analog signal AS2 row by row.

Figure 5:
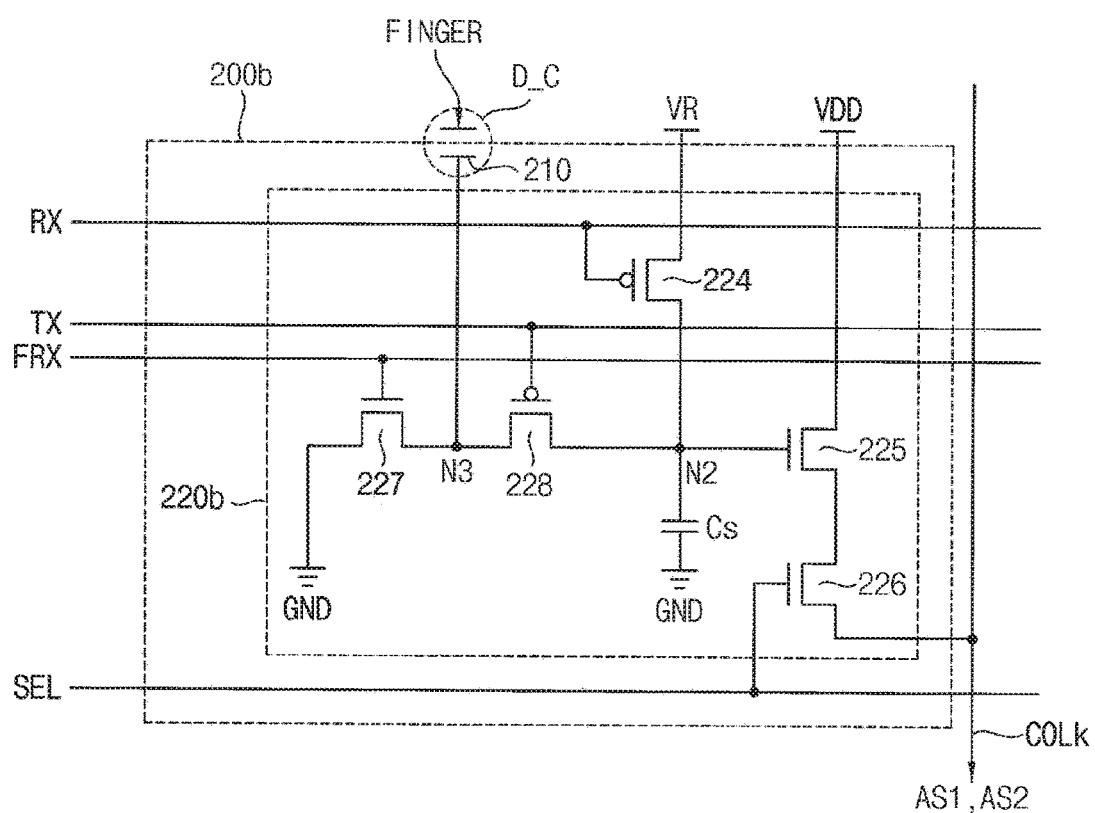
FIG. 5 is a circuit diagram illustrating another example of a unit pixel included in the fingerprint sensor of FIG. 1.

FIG. 5 is a circuit diagram illustrating another example of a unit pixel included in the fingerprint sensor of FIG. 1.

Each of the plurality of unit pixels 200 included in the pixel array 100 of FIG. 1 may be implemented with a unit pixel 200b of FIG. 5.

When each of the plurality of unit pixels 200 included in the pixel array 100 of FIG. 1 is implemented with the unit pixel 200b of FIG. 5, the control signals CON1, which are provided by the controller 500 to each of the plurality of unit pixels 200b, may include a first reset control signal RX, a second reset control signal FRX, a transmission control signal TX, and a row selection signal SEL.

Referring to FIG. 5, the unit pixel 200b may include a sensing electrode 210 and a signal generation circuit 220b.

As illustrated in FIG. 5, the sensing electrode 210 included in the unit pixel 200b may form the detection capacitor D_C together with the finger contacted on the pixel array 100.

The signal generation circuit 220b may include a first reset transistor 224, a drive transistor 225, a row selection transistor 226, a second reset transistor 227, a transmission transistor 228, and a storage capacitor Cs.

The storage capacitor Cs may be coupled between a ground voltage GND and a second node N2.

The first reset transistor 224 may include a source coupled to a reset voltage VR, a drain coupled to the second node N2, and a gate receiving the first reset control signal RX provided by the controller 500. When the first reset transistor 224 is turned on in response to the first reset control signal RX, the second node N2 may be reset to the reset voltage VR.

The second reset transistor 227 may include a source coupled to the ground voltage GND, a drain coupled to a third node N3, and a gate receiving the second reset control signal FRX provided by the controller 500. The third node N3 may be coupled to the sensing electrode 210. When the second reset transistor 227 is turned on in response to the second reset control signal FRX, the third node N3 may be reset to the ground voltage GND.

The transmission transistor 228 may include a source coupled to the second node N2, a drain coupled to the third node N3, and a gate receiving the transmission control signal TX provided by the controller 500. When the transmission transistor 228 is turned on in response to the transmission control signal TX, the second node N2 may be connected to the third node N3 such that a charge sharing may occur between the detection capacitor D_C, which is formed by the sensing electrode 210 and the finger contacted on the pixel array 100, and the storage capacitor Cs. Therefore, when the transmission transistor 228 is turned on, a detection voltage formed at the second node N2 may be determined based on a ratio of the capacitance of the detection capacitor D_C to a capacitance of the storage capacitor Cs.

The drive transistor 225 may include a source coupled to a drain of the row selection transistor 226, a drain coupled to the supply voltage VDD, and a gate coupled to the second node N2. The drive transistor 225 may generate an analog signal having a magnitude determined based on a voltage level of the detection voltage formed at the second node N2.

The row selection transistor 226 may include a drain coupled to the source of the drive capacitor 225, a gate receiving the row selection signal SEL provided by the controller 500, and a source coupled to the corresponding column line COLk.

When the row selection transistor 226 is turned on in response to the row selection signal SEL, the analog signal generated by the drive transistor 225 may be provided to the analog-to-digital converter 300 through the corresponding column line COLk as the first analog signal AS1 and the second analog signal AS2.

On the other hand, when the row selection transistor 226 is turned off in response to the row selection signal SEL, the signal generation circuit 220b may be disconnected from the corresponding column line COLk.

In some example embodiments, each of the first reset transistor 224 and the transmission transistor 228 may be a p-type metal oxide semiconductor (PMOS) transistor, and each of the second reset transistor 227, the drive transistor 225, and the row selection transistor 226 may be an n-type metal oxide semiconductor (NMOS) transistor.

Figure 6:
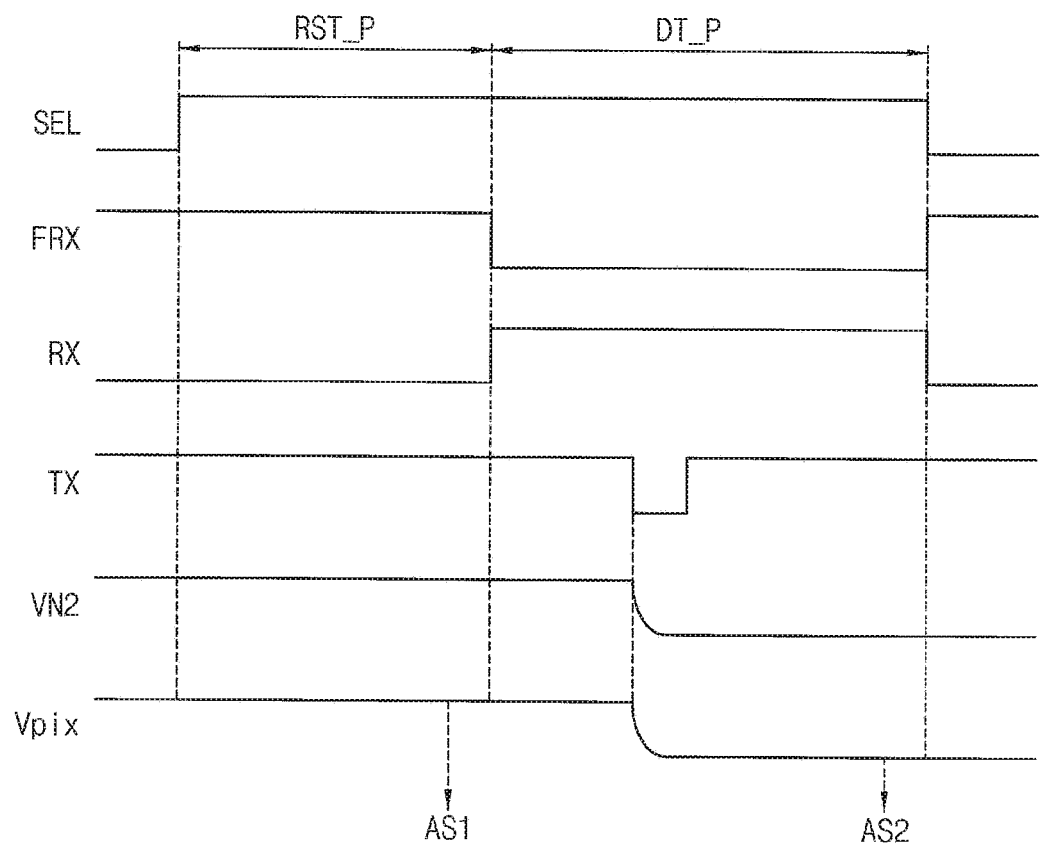
FIG. 6 is a timing diagram for describing an operation of the unit pixel of FIG. 5.

FIG. 6 is a timing diagram for describing an operation of the unit pixel of FIG. 5.

Hereinafter, an operation of the pixel array 100 will be described with reference to FIGS. 1, 2, 5 and 6 when the pixel array 100 includes the unit pixel 200b of FIG. 5.

When a finger contacts on the pixel array 100, the controller 500 may determine one of the rows included in the pixel array 100 as a selected row and determine the rest of the rows except for the selected row as unselected rows.

The controller 500 may provide the row selection signal SEL inactivated in a logic low level to each of unselected unit pixels 200b included in the unselected rows. Therefore, the row selection transistor 226 included in each of the unselected unit pixels 200b may be turned off, such that the signal generation circuit 220b included in each of the unselected unit pixels 200b may be disconnected from the corresponding column line COLk.

In addition, the controller 500 may provide the row selection signal SEL activated in a logic high level to each of selected unit pixels 200b included in the selected row. Therefore, the row selection transistor 226 included in the selected unit pixel 200b may be turned on, such that the signal generation circuit 220b included in the selected unit pixel 200b may be coupled to the corresponding column line COLk.

As illustrated in FIG. 6, the activated period of the row selection signal SEL may be divided into a reset period RST_P and a detection period DT_P.

Referring to FIG. 6, the controller 500 may provide the first reset control signal RX activated in a logic low level, the second reset control signal FRX activated in a logic high level, and the transmission control signal TX inactivated in a logic high level to the selected unit pixel 200b during the reset period RST_P.

Since the transmission transistor 228 included in the selected unit pixel 200b is turned off in response to the transmission control signal TX inactivated in a logic high level, the second node N2 may be disconnected from the third node N3 during the reset period RST_P.

Since the first reset transistor 224 included in the selected unit pixel 200b is turned on in response to the first reset control signal RX activated in the logic low level, the detection voltage VN2 formed at the second node N2 may be reset to the reset voltage VR and charges corresponding to a voltage difference between the reset voltage VR and the ground voltage GND may be charged in the storage capacitor Cs during the reset period RST_P.

In addition, since the second reset transistor 227 included in the selected unit pixel 200b is turned on in response to the second reset control signal FRX activated in the logic high level, a voltage formed at the third node N3 may be reset to the ground voltage GND and charges corresponding to a voltage difference between the ground voltage GND and a voltage of the finger may be charged in the detection capacitor D_C during the reset period RST_P.

Since the gate of the drive transistor 225 receives the detection voltage VN2 formed at the second node N2, the reset voltage VR may be provided to the gate of the drive transistor 225. Therefore, the signal generation circuit 220b included in the selected unit pixel 200b may output a pixel signal Vpix corresponding to the reset voltage VR through the drive transistor 225 and the row selection transistor 226 as the first analog signal AS1 during the reset period RST_P.

After that, the controller 500 may provide the first reset control signal RX inactivated in a logic high level and the second reset control signal FRX inactivated in a logic low level to the selected unit pixel 200b during the detection period DT_P. Since the first reset transistor 224 and the second reset transistor 227 included in the selected unit pixel 200b are turned off, the sensing electrode 210 and the storage capacitor Cs included in the selected unit pixel 200b may be floated during the detection period DT_P.

After that, the controller 500 may provide the transmission control signal TX activated in a logic low level to the selected unit pixel 200b. Since the transmission transistor 228 included in the selected unit pixel 200b is turned on in response to the transmission control signal TX activated in a logic low level, a charge sharing may occur between the detection capacitor D_C and the storage capacitor Cs. Therefore, as illustrated in FIG. 6, the detection voltage VN2 formed at the second node N2 of the selected unit pixel 200b may decrease based on a ratio of the capacitance of the detection capacitor D_C, which is formed by the sensing electrode 210 and the finger contacted on the pixel array 100, to the capacitance of the storage capacitor Cs.

Since the gate of the drive transistor 225 receives the detection voltage VN2 formed at the second node N2, the signal generation circuit 220b included in the selected unit pixel 200b may output the pixel signal Vpix corresponding to a voltage level of the detection voltage VN2 through the drive transistor 225 and the row selection transistor 226 as the second analog signal AS2 during the detection period DT_P.

After that, the controller 500 may consecutively select each of the rows included in the pixel array 100 by moving in a unit of a row to determine the selected row, and repeatedly perform the operation described above with reference to FIG. 6 on the selected row, such that the pixel array 100 may output the first analog signal AS1 and the second analog signal AS2 row by row.

Hereinabove, examples of the unit pixel 200 included in the fingerprint sensor 10 of FIG. 1 are described with reference to FIGS. 3 to 6. However, example embodiments are not limited thereto. According to example embodiments, each of the plurality of unit pixels 200 included in the fingerprint sensor 10 of FIG. 1 may have various structures to generate the first analog signal AS1, which corresponds to a reset element, and the second analog signal AS2, which corresponds to the fingerprint of the finger, alternately.

Referring again to FIG. 1, the controller 500 may control an operation of the reference signal generator 400 using a phase signal PS and a count enable signal CNT_EN, and control an operation of the analog-to-digital converter 300 using a count clock signal CLKC and an up-down signal UD.

The reference signal generator 400 may generate a reference signal Vref, which decreases in a first rate from a start voltage, based on the phase signal PS and the count enable signal CNT_EN received from the controller 500.

The analog-to-digital converter 300 may perform an analog-to-digital conversion operation on the first analog signal AS1 and the second analog signal AS2, which are provided by the pixel array 100 row by row, based on the count clock signal CLKC and the up-down signal UD received from the controller 500 and the reference signal Vref received from the reference signal generator 400 to generate a digital signal DS. For example, the analog-to-digital converter 300 may correspond to a single slope analog-to-digital converter.

In some example embodiments, the reference signal generator 400 may generate the reference signal Vref decreasing in the first rate from a first start voltage during the reset period RST_P, in which each of the plurality of unit pixels 200 generates the first analog signal AS1 corresponding to the reset element, and generate the reference signal Vref decreasing in the first rate from a second start voltage, which is lower than the first start voltage, during the detection period DT_P, in which each of the plurality of unit pixels 200 generates the second analog signal AS2 corresponding to the fingerprint of the finger on the pixel array 100.

In this case, the analog-to-digital converter 300 may perform a correlated double sampling (CDS) operation on the first analog signal AS1 and the second analog signal As2 based on the reference signal Vref to generate the digital signal DS. For example, the analog-to-digital converter 300 may generate a first digital signal by comparing the reference signal Vref decreasing in the first rate from the first start voltage with a magnitude of the first analog signal AS1 during the reset period RST_P, generate a second digital signal by comparing the reference signal Vref decreasing in the first rate from the second start voltage with a magnitude of the second analog signal AS2 during the detection period DT_P, and then output a difference between the first digital signal and the second digital signal as the digital signal DS.

The reference signal generator 400 may adjust at least one of a magnitude of the second start voltage and a magnitude of the first rate based on a magnitude of the digital signal DS generated by the analog-to-digital converter 300.

Figure 7:
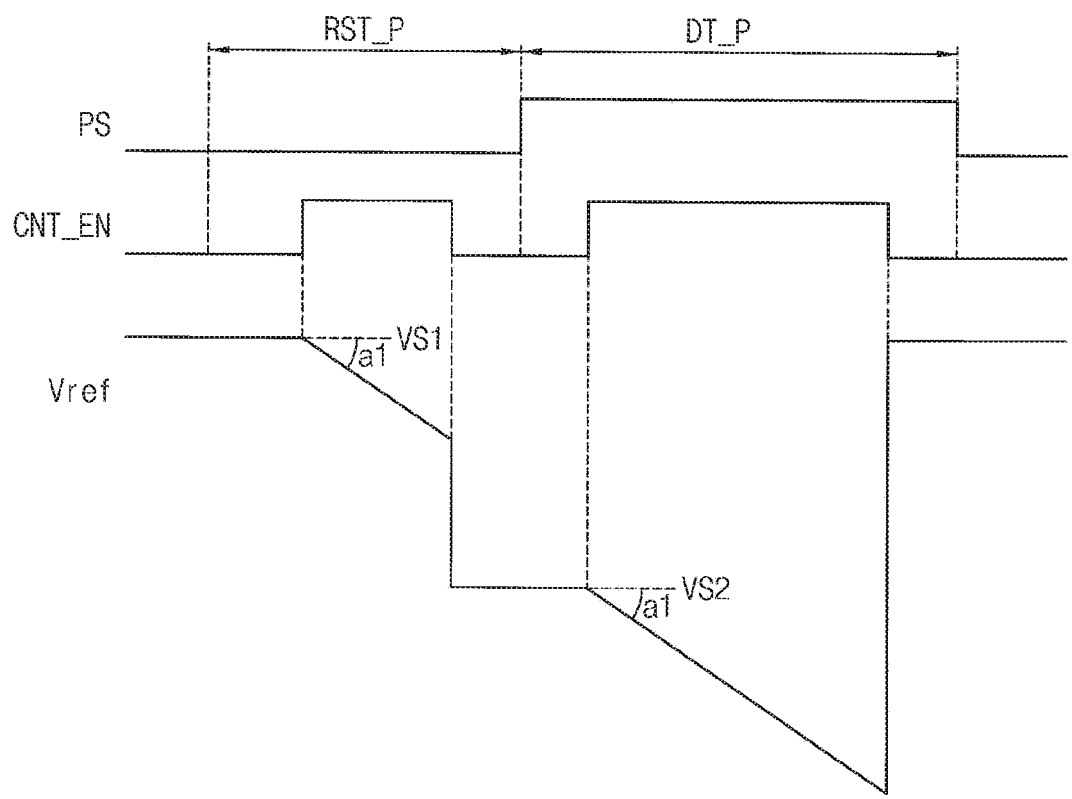
FIG. 7 is a diagram for describing an operation of a reference signal generator included in the fingerprint sensor of FIG. 1.

FIG. 7 is a diagram for describing an operation of a reference signal generator included in the fingerprint sensor of FIG. 1.

Referring to FIG. 7, the controller 500 may provide the phase signal PS, which has a first logic level during the reset period RST_P and a second logic level during the detection period DT_P, to the reference signal generator 400. In some example embodiments, the first logic level may correspond to a logic low level, and the second logic level may correspond to a logic high level.

During the reset period RST_P in which the phase signal PS has the first logic level, the reference signal generator 400 may generate the reference signal Vref, which decreases in the first rate a1 from the first start voltage VS1, while the count enable signal CNT_EN is activated.

In some example embodiments, a magnitude of the first start voltage VS1 may be predetermined and/or selected. In addition, the reference signal generator 400 may determine a magnitude of the first rate a1 based on the magnitude of the digital signal DS generated by the analog-to-digital converter 300. An operation of the reference signal generator 400 to determine the magnitude of the first rate a1 based on the magnitude of the digital signal DS will be described later.

During the detection period DT_P in which the phase signal PS has the second logic level, the reference signal generator 400 may generate the reference signal Vref, which decreases in the first rate a1 from the second start voltage VS2 lower than the first start voltage VS1, while the count enable signal CNT_EN is activated.

In some example embodiments, the reference signal generator 400 may determine a magnitude of the second start voltage VS2 based on the magnitude of the digital signal DS generated by the analog-to-digital converter 300. An operation of the reference signal generator 400 to determine the magnitude of the second start voltage VS2 based on the magnitude of the digital signal DS will be described later.

Figure 8:
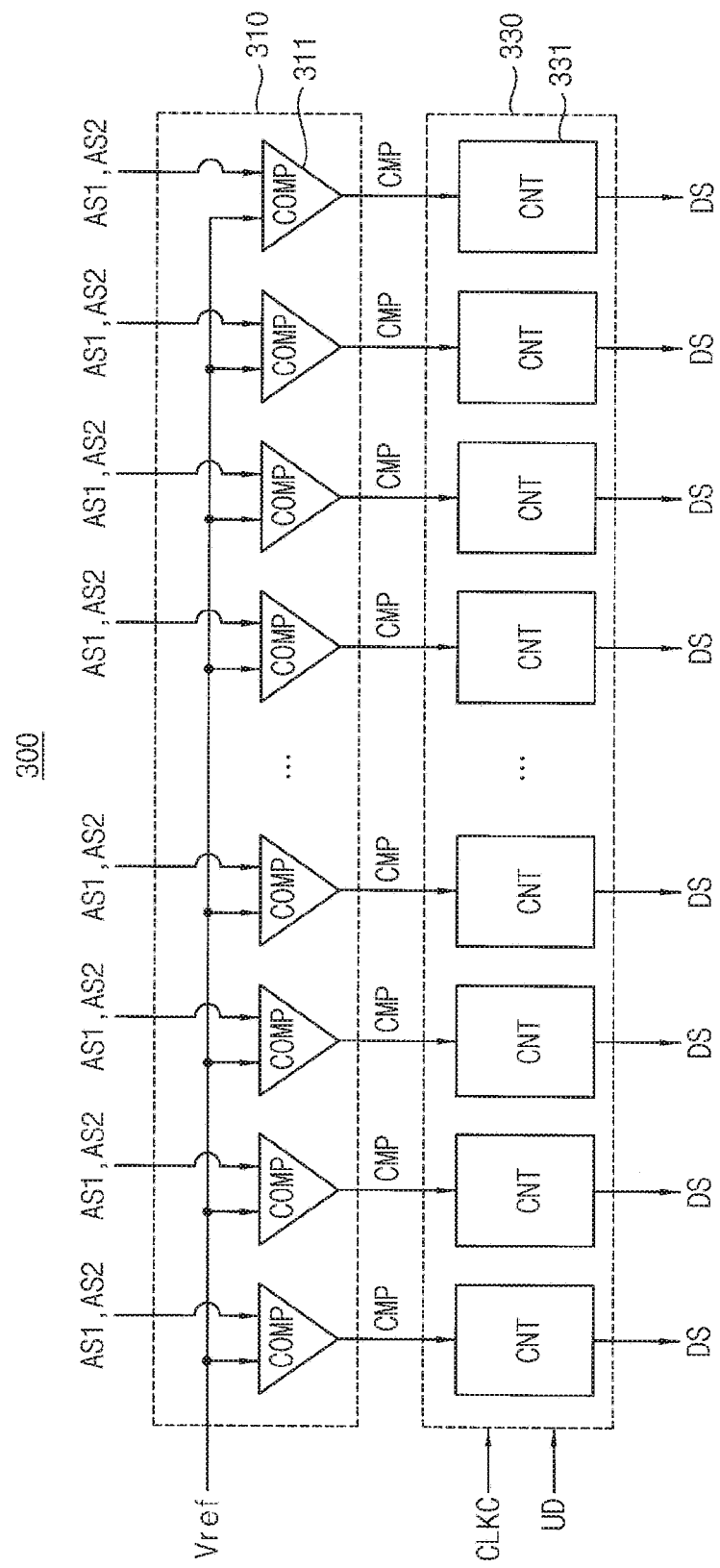
FIG. 8 is a block diagram illustrating an example of an analog-to-digital converter included in the fingerprint sensor of FIG. 1.

FIG. 8 is a block diagram illustrating an example of an analog-to-digital converter included in the fingerprint sensor of FIG. 1.

Referring to FIG. 8, the analog-to-digital converter 300 may include a comparison circuit 310 and a count circuit 330.

The comparison circuit 310 may include a plurality of comparators COMP 311 connected to the plurality of column lines COL1, COL2, . . . , COLn, respectively.

Each of the plurality of comparators 311 may generate a comparison signal CMP by comparing the first analog signal AS1, which is received from the pixel array 100 through the corresponding column line COLk, with the reference signal Vref, which is received from the reference signal generator 400, and comparing the second analog signal AS2, which is received from the pixel array 100 through the corresponding column line COLk, with the reference signal Vref, which is received from the reference signal generator 400. For example, when each of the plurality of comparators 311 receives the first analog signal AS1 from the pixel array 100, each of the plurality of comparators 311 may compare the first analog signal AS1 with the reference signal Vref, activate the comparison signal CMP if the first analog signal AS1 is smaller than the reference signal Vref, and deactivate the comparison signal CMP if the first analog signal AS1 is greater than the reference signal Vref. Similarly, when each of the plurality of comparators 311 receives the second analog signal AS2 from the pixel array 100, each of the plurality of comparators 311 may compare the second analog signal AS2 with the reference signal Vref, activate the comparison signal CMP if the second analog signal AS2 is smaller than the reference signal Vref, and deactivate the comparison signal CMP if the second analog signal AS2 is greater than the reference signal Vref. The comparison signal CMP may be activated at a logic high level and be deactivated at a logic low level.

The count circuit 330 may include a plurality of counters CNT 331 connected to the plurality of comparators 311, respectively.

The plurality of counters 331 may receive the comparison signal CMP from the plurality of comparators 311, respectively. Each of the plurality of counters 331 may receive the count clock signal CLKC and the up-down signal UD from the controller 500, and generate a count value by performing one of a down-count operation and an up-count operation based on the up-down signal UD in synchronization with the count clock signal CLKC while the comparison signal CMP is activated. The count clock signal CLKC may be toggled only while the count enable signal CNT_EN is activated.

Each of the plurality of counters 331 may perform the down-count operation when the up-down signal UD has a first logic level, and perform the up-count operation when the up-down signal UD has a second logic level. The controller 500 may control each of the plurality of counters 331 to perform the down-count operation by providing the up-down signal UD having the first logic level to each of the plurality of counters 331 during the reset period RST_P in which the pixel array 100 outputs the first analog signal AS1, and control each of the plurality of counters 331 to perform the up-count operation by providing the up-down signal UD having the second logic level to each of the plurality of counters 331 during the detection period DT_P in which the pixel array 100 outputs the second analog signal AS2. In some example embodiments, the first logic level may be a logic low level and the second logic level may be a logic high level.

Each of the plurality of counters 331 may generate a first count value by performing the down-count operation from zero in synchronization with the count clock signal CLKC while the comparison signal CMP is activated in the reset period RST_P, and generate a second count value by performing the up-count operation from the first count value in synchronization with the count clock signal CLKC while the comparison signal CMP is activated in the detection period DT_P. Each of the plurality of counters 331 may output the second count value as the digital signal DS.

Figure 9:
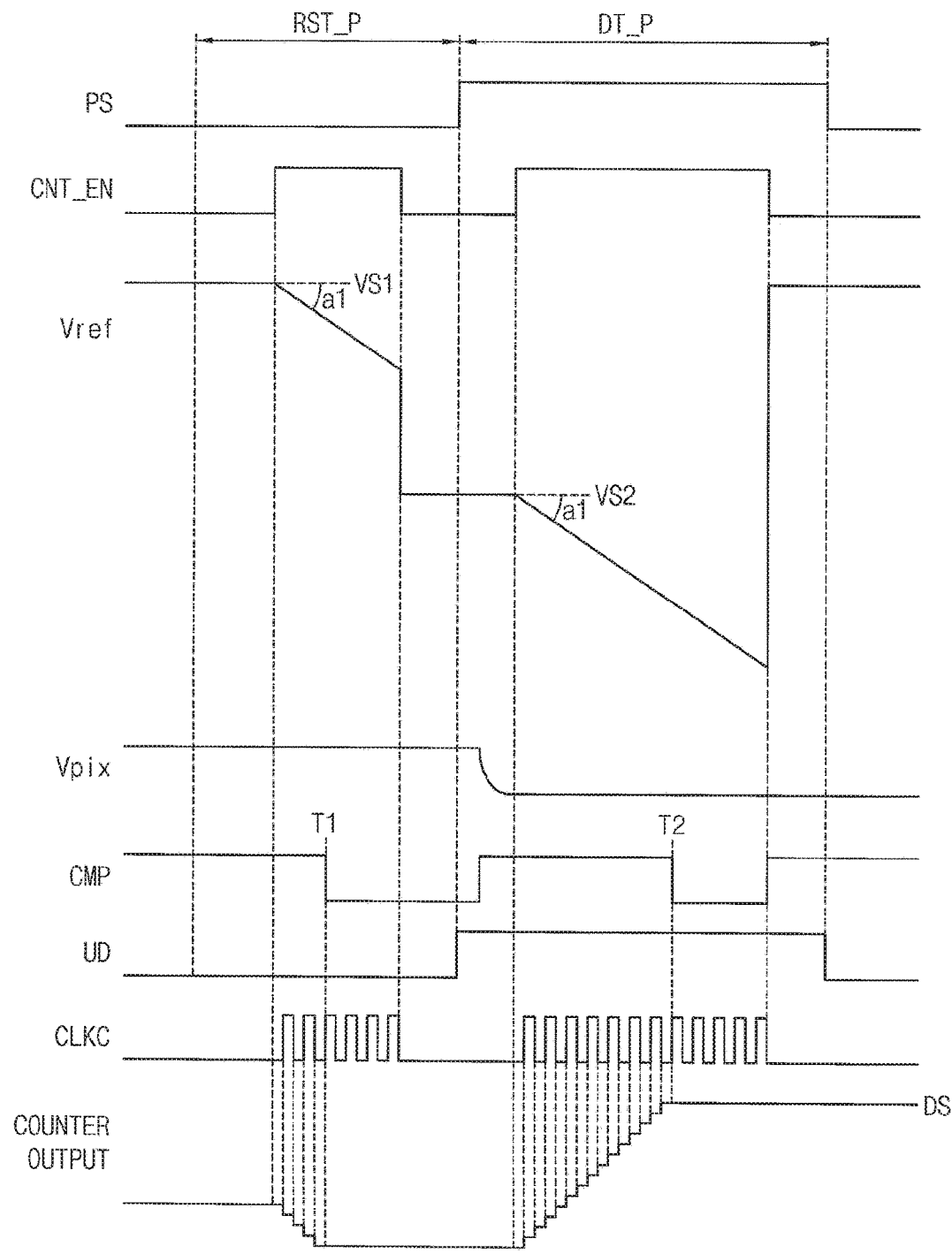
FIG. 9 is a timing diagram for describing an operation of the fingerprint sensor of FIG. 1.

FIG. 9 is a timing diagram for describing an operation of the fingerprint sensor of FIG. 1.

When a finger contacts on the pixel array 100, the controller 500 may determine one of the rows included in the pixel array 100 as the selected row and determine the rest of the rows except for the selected row as the unselected rows.

In FIG. 9, a sensing operation of the fingerprint sensor 10 for the selected row is illustrated.

The controller 500 may provide the phase signal PS having the first logic level to the reference signal generator 400 and the up-down signal UD having the first logic level to the analog-to-digital converter 300 during the reset period RST_P.

The pixel signal Vpix output from each of the selected unit pixels 200 included in the selected row during the reset period RST_P may correspond to the first analog signal AS1.

When the controller 500 activates the count enable signal CNT_EN in the reset period RST_P, the reference signal generator 400 may generate the reference signal Vref decreasing in the first rate a1 from the first start voltage VS1. In addition, the controller 500 may provide the count clock signal CLKC to the plurality of counters 331 while the count enable signal CNT_EN is activated, and each of the plurality of counters 331 may perform the down-count operation from zero in synchronization with the count clock signal CLKC.

As illustrated in FIG. 9, at a time T1, the reference signal Vref may become equal to the pixel signal Vpix, and the comparator 311 may provide the comparison signal CMP having a logic low level to the counter 331 such that the counter 331 may stop performing the down-count operation. At the time T1, an output value of the counter 331 may be the first count value which corresponds to a magnitude of the first analog signal AS1.

After that, the controller 500 may provide the phase signal PS having the second logic level to the reference signal generator 400 and the up-down signal UD having the second logic level to the analog-to-digital converter 300 during the detection period DT_P.

The pixel signal Vpix output from each of the selected unit pixels 200 included in the selected row during the detection period DT_P may correspond to the second analog signal AS2.

When the controller 500 activates the count enable signal CNT_EN in the detection period DT_P, the reference signal generator 400 may generate the reference signal Vref decreasing in the first rate a1 from the second start voltage VS2, which is lower than the first start voltage VS1. In addition, the controller 500 may provide the count clock signal CLKC to the plurality of counters 331 while the count enable signal CNT_EN is activated, and each of the plurality of counters 331 may perform the up-count operation from the first count value in synchronization with the count clock signal CLKC.

As illustrated in FIG. 9, at a time T2, the reference signal Vref may become equal to the pixel signal Vpix, and the comparator 311 may provide the comparison signal CMP having a logic low level to the counter 331 such that the counter 331 may stop performing the up-count operation. At the time T2, an output value of the counter 331 may be the second count value which corresponds to a difference between the magnitude of the first analog signal AS1 and the magnitude of the second analog signal AS2. Each of the plurality of counters 331 may output the second count value as the digital signal DS.

After that, the fingerprint sensor 10 may consecutively select each of the rows included in the pixel array 100 as the selected row, and repeatedly perform the operation described above with reference to FIG. 9 on the selected row, such that the fingerprint sensor 10 may generate the digital signal DS row by row.

Generally, since a difference between a capacitance of the detection capacitor D_C formed by the sensing electrode 210 included in the unit pixel 200 on which a ridge of the fingerprint is located and a capacitance of the detection capacitor D_C formed by the sensing electrode 210 included in the unit pixel 200 on which a valley of the fingerprint is located is very small, a difference between the magnitude of the second analog signal AS2 generated from the unit pixel 200 on which a ridge of the fingerprint is located and the magnitude of the second analog signal AS2 generated from the unit pixel 200 on which a valley of the fingerprint is located may be also very small.

Therefore, if the reference signal generator 400 generates the reference signal Vref decreasing in the first rate a1 from the first start voltage VS1 during both the reset period RST_P and the detection period DT_P, most of the portions of the magnitude of the digital signal DS generated by the analog-to-digital converter 300 may correspond to an offset element, which is commonly included in the second analog signal AS2 generated from the unit pixel 200 on which a ridge of the fingerprint is located and the second analog signal AS2 generated from the unit pixel 200 on which a valley of the fingerprint is located. Therefore, a resolution of the fingerprint sensor 10 may be decreased.

On the other hand, the reference signal generator 400 included in the fingerprint sensor 10 according to example embodiments may generate the reference signal Vref, which decreases in the first rate a1 from the first start voltage VS1, while the count enable signal CNT_EN is activated in the reset period RST_P, and generate the reference signal Vref, which decreases in the first rate a1 from the second start voltage VS2 lower than the first start voltage VS1, while the count enable signal CNT_EN is activated in the detection period DT_P. In addition, the reference signal generator 400 may adjust at least one of the magnitude of the second start voltage VS2 and the magnitude of the first rate a1 based on the magnitude of the digital signal DS generated by the analog-to-digital converter 300.

Therefore, the analog-to-digital converter 300 may perform an analog-to-digital conversion operation on the first analog signal AS1 and the second analog signal AS2 with a high resolution to generate the digital signal DS. As such, a resolution of the fingerprint sensor 10 may be effectively increased.

Figure 10:
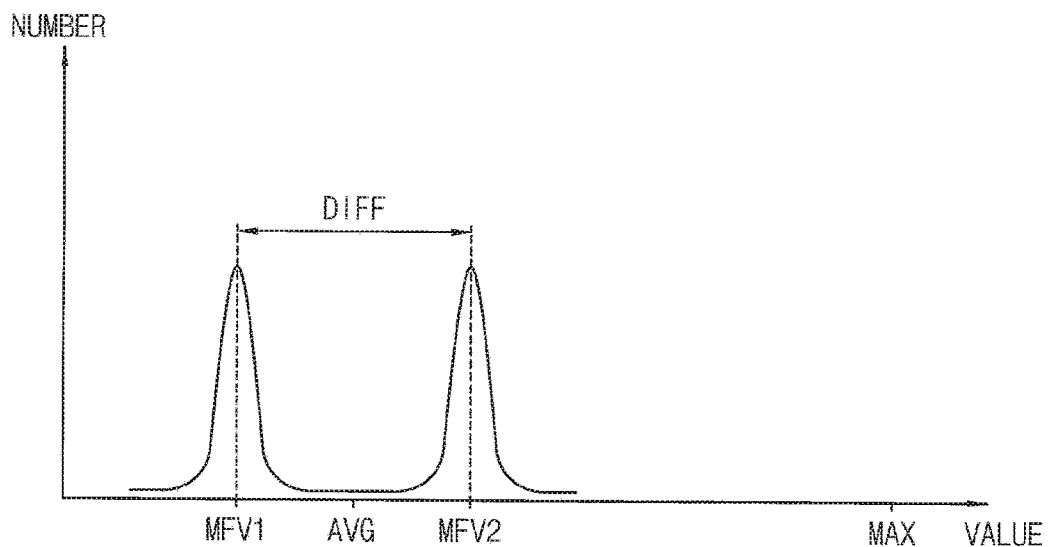
FIGS. 10 and 11 are diagrams illustrating distributions of a digital signal generated by the analog-to-digital converter included in the fingerprint sensor of FIG. 1.
Figure 11:
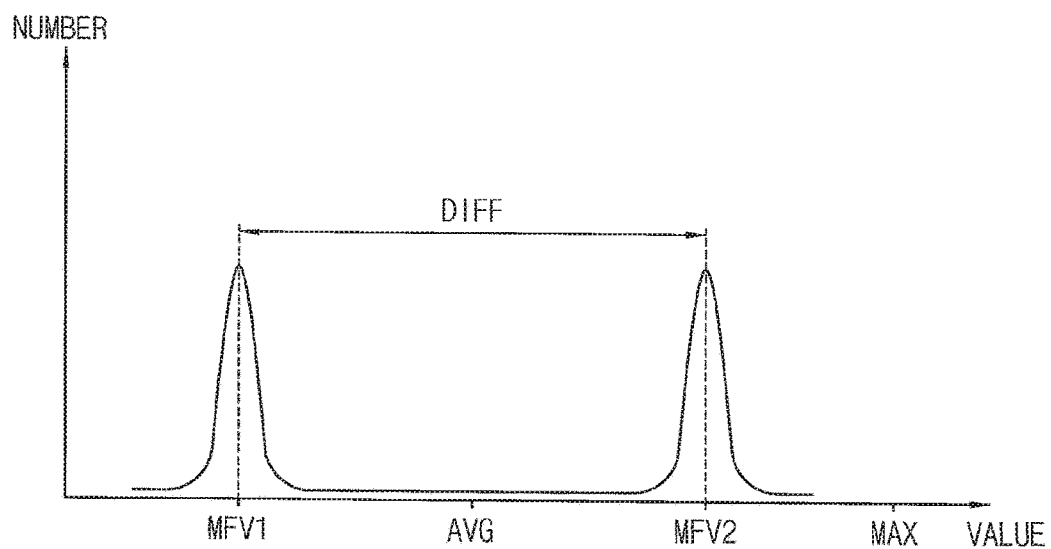

FIGS. 10 and 11 are diagrams illustrating distributions of digital signals generated by the analog-to-digital converter included in the fingerprint sensor of FIG. 1.

In FIGS. 10 and 11, an x-axis represents a value of the digital signal DS generated by the analog-to-digital converter 300, and a y-axis represents the number of the digital signals DS having a corresponding value.

Hereinafter, an increase of the resolution of the fingerprint sensor 10 according to an adjustment of at least one of the magnitude of the second start voltage VS2 and the magnitude of the first rate a1 will be described with reference to FIGS. 10 and 11.

As illustrated in FIGS. 10 and 11, a distribution of a value of the digital signal DS generated by the analog-to-digital converter 300 may be symmetric with reference to a first most frequent value MFV1 and a second most frequent value MFV2. The first most frequent value MFV1 and the second most frequent value MFV2 may correspond to a magnitude of the digital signal DS generated based on the first analog signal AS1 and the second analog signal AS2, which are generated by the unit pixel 200 on which a ridge of the fingerprint is located, and a magnitude of the digital signal DS generated based on the first analog signal AS1 and the second analog signal AS2, which are generated by the unit pixel 200 on which a valley of the fingerprint is located. In some example embodiments, the first most frequent value MFV1 may correspond to the most frequent value among the values of the digital signals DS, and the second most frequent value MFV2 may correspond to the second most frequent value among the values of the digital signals DS. In other example embodiments, the second most frequent value MFV2 may correspond to the most frequent value among the values of the digital signals DS, and the first most frequent value MFV1 may correspond to the second most frequent value among the values of the digital signals DS.

In some example embodiments, the reference signal generator 400 may calculate an average value AVG by averaging the values of the digital signals DS received from the analog-to-digital converter 300. In some example embodiments, the reference signal generator 400 may calculate the average value AVG by averaging the values of the digital signals DS corresponding to one row of the pixel array 100. In other example embodiments, the reference signal generator 400 may calculate the average value AVG by averaging the values of the digital signals DS corresponding to one frame of the pixel array 100.

In other example embodiments, the reference signal generator 400 may determine the first most frequent value MFV1 and the second most frequent value MFV2, which are the two most frequent values among the digital signals DS received from the analog-to-digital converter 300, and calculate the average value AVG by averaging the first most frequent value MFV1 and the second most frequent value MFV2. In some example embodiments, the reference signal generator 400 may determine the first most frequent value MFV1 and the second most frequent value MFV2 among the digital signals DS corresponding to one row of the pixel array 100. In other example embodiments, the reference signal generator 400 may determine the first most frequent value MFV1 and the second most frequent value MFV2 among the digital signals DS corresponding to one frame of the pixel array 100.

After that, the reference signal generator 400 may adjust the magnitude of the second start voltage VS2 based on the average value AVG.

For example, when the average value AVG is greater than a first reference value, the reference signal generator 400 may decrease the magnitude of the second start voltage VS2 such that an overall magnitude of the digital signal DS generated by the analog-to-digital converter 300 may be decreased. On the other hand, when the average value AVG is smaller than the first reference value, the reference signal generator 400 may increase the magnitude of the second start voltage VS2 such that an overall magnitude of the digital signal DS generated by the analog-to-digital converter 300 may be increased.

In some example embodiments, the first reference value may correspond to a half of a maximum value MAX that the analog-to-digital converter 300 is able to output. For example, when the analog-to-digital converter 300 outputs the digital signal DS of ten bits, the maximum value MAX that the analog-to-digital converter 300 is able to output may be 1023, and the first reference value may be 511.

Generally, the capacitance of the detection capacitor D_C, which is formed by the sensing electrode 210 included in the unit pixel 200 and the finger, may vary according to humidity or vary by people.

As described above, the fingerprint sensor 10 according to example embodiments may adjust the magnitude of the second start voltage VS2, which corresponds to a start voltage of the reference signal Vref in the detection period DT_P, based on magnitudes of the digital signals DS corresponding to one row or one frame of the pixel array 100. Therefore, as illustrated in FIG. 11, the first most frequent value MFV1, which represents a magnitude of the digital signal DS corresponding to a ridge of the fingerprint, and the second most frequent value MFV2, which represents a magnitude of the digital signal DS corresponding to a valley of the fingerprint, may be symmetric with reference to the half of the maximum value MAX that the analog-to-digital converter 300 is able to output.

In addition, the reference signal generator 400 may adjust the magnitude of the first rate a1 based on a difference DIFF between the first most frequent value MFV1 and the second most frequent value MFV2.

For example, when the difference DIFF between the first most frequent value MFV1 and the second most frequent value MFV2 is greater than a second reference value, the reference signal generator 400 may increase the magnitude of the first rate a1. In this case, a difference between the magnitude of the digital signal DS corresponding to a ridge of the fingerprint and the magnitude of the digital signal DS corresponding to a valley of the fingerprint may decrease. On the other hand, when the difference DIFF between the first most frequent value MFV1 and the second most frequent value MFV2 is smaller than the second reference value, the reference signal generator 400 may decrease the magnitude of the first rate a1. In this case, a difference between the magnitude of the digital signal DS corresponding to a ridge of the fingerprint and the magnitude of the digital signal DS corresponding to a valley of the fingerprint may increase.

Therefore, as illustrated in FIG. 11, the reference signal generator 400 may adjust the magnitude of the second start voltage VS2 and the magnitude of the first rate a1 based on the magnitude of the digital signal DS generated by the analog-to-digital converter 300, such that the magnitude of the digital signal DS corresponding to a ridge of the fingerprint and the magnitude of the digital signal DS corresponding to a valley of the fingerprint may be symmetric with reference to the half of the maximum value MAX. In this case, each of the magnitude of the digital signal DS corresponding to a ridge of the fingerprint and the magnitude of the digital signal DS corresponding to a valley of the fingerprint may be apart from the half of the maximum value MAX by a half of the second reference value.

As described above, although a difference between the magnitude of the second analog signal AS2 generated from the unit pixel 200 on which a ridge of the fingerprint is located and the magnitude of the second analog signal AS2 generated from the unit pixel 200 on which a valley of the fingerprint is located is very small, the fingerprint sensor 10 according to example embodiments may effectively eliminate an offset element, which is commonly included in the second analog signal AS2 generated from the unit pixel 200 on which a ridge of the fingerprint is located and the second analog signal AS2 generated from the unit pixel 200 on which a valley of the fingerprint is located, such that a difference between the magnitude of the digital signal DS corresponding to a ridge of the fingerprint and the magnitude of the digital signal DS corresponding to a valley of the fingerprint may be effectively increased. That is, since the analog-to-digital converter 300 performs an analog-to-digital conversion operation on the first analog signal AS1 and the second analog signal AS2 with a high resolution to generate the digital signal DS, a resolution of the fingerprint sensor 10 may be effectively increased.

Figure 12:
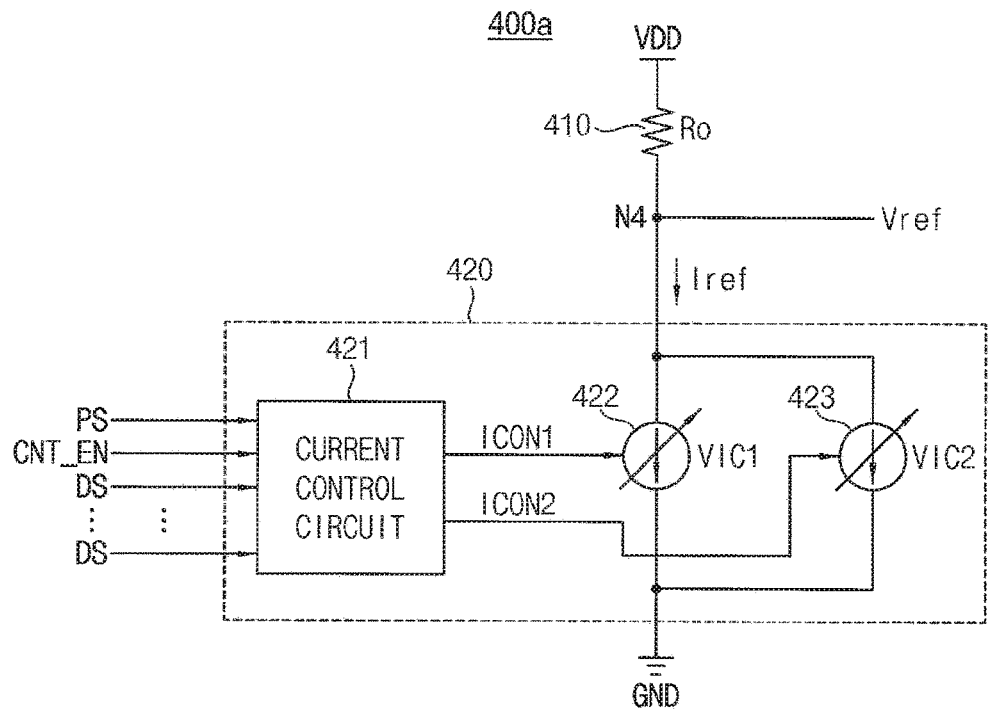
FIG. 12 is a block diagram illustrating an example of a reference signal generator included in the fingerprint sensor of FIG. 1.

FIG. 12 is a block diagram illustrating an example of a reference signal generator included in the fingerprint sensor of FIG. 1.

Referring to FIG. 12, a reference signal generator 400a may include a reference resistor 410 and a current generation circuit 420.

The reference resistor 410 may be coupled between the supply voltage VDD and a fourth node N4 at which the reference signal Vref is output. The reference resistor 410 may have a predetermined and/or selected resistance Ro.

The current generation circuit 420 may be coupled between the fourth node N4 and the ground voltage GND. The current generation circuit 420 may generate a reference current Iref flowing from the fourth node N4 to the ground voltage GND. The current generation circuit 420 may receive the phase signal PS and the count enable signal CNT_EN from the controller 500, and receive the digital signal DS from the analog-to-digital converter 300.

During the reset period RST_P in which the phase signal PS has the first logic level, the current generation circuit 420 may generate the reference current Iref, which increases in a second rate from a first start current, based on the digital signal DS while the count enable signal CNT_EN is activated. During the detection period DT_P in which the phase signal PS has the second logic level, the current generation circuit 420 may generate the reference current Iref, which increases in the second rate from a second start current greater than the first start current, based on the digital signal DS while the count enable signal CNT_EN is activated.

Therefore, during the reset period RST_P, the reference signal generator 400a may generate the reference signal Vref corresponding to the first start voltage VS1 while the current generation circuit 420 generates the reference current Iref corresponding to the first start current, and the reference signal generator 400a may decrease the magnitude of the reference signal Vref in the first rate a1 while the current generation circuit 420 increases the magnitude of the reference current Iref in the second rate. During the detection period DT_P, the reference signal generator 400a may generate the reference signal Vref corresponding to the second start voltage VS2, which is lower than the first start voltage VS1, while the current generation circuit 420 generates the reference current Tref corresponding to the second start current, which is greater than the first start current, and the reference signal generator 400a may decrease the magnitude of the reference signal Vref in the first rate a1 while the current generation circuit 420 increases the magnitude of the reference current Tref in the second rate.

In some example embodiments, the current generation circuit 420 may determine the first most frequent value MFV1 and the second most frequent value MFV2, which are the two most frequent values among the digital signals DS received from the analog-to-digital converter 300, and calculate the average value AVG by averaging the first most frequent value MFV1 and the second most frequent value MFV2. In some example embodiments, the current generation circuit 420 may determine the first most frequent value MFV1 and the second most frequent value MFV2 among the digital signals DS corresponding to one row of the pixel array 100. In other example embodiments, the current generation circuit 420 may determine the first most frequent value MFV1 and the second most frequent value MFV2 among the digital signals DS corresponding to one frame of the pixel array 100.

After that, the current generation circuit 420 may adjust the magnitude of the second start current based on the average value AVG.

For example, when the average value AVG is greater than the first reference value, the current generation circuit 420 may increase the magnitude of the second start current such that an overall magnitude of the digital signal DS generated by the analog-to-digital converter 300 may be decreased. On the other hand, when the average value AVG is smaller than the first reference value, the current generation circuit 420 may decrease the magnitude of the second start current such that an overall magnitude of the digital signal DS generated by the analog-to-digital converter 300 may be increased.

In addition, the current generation circuit 420 may adjust the magnitude of the second rate based on the difference DIFF between the first most frequent value MFV1 and the second most frequent value MFV2.

For example, when the difference DIFF between the first most frequent value MFV1 and the second most frequent value MFV2 is greater than the second reference value, the current generation circuit 420 may increase the magnitude of the second rate. In this case, a difference between the magnitude of the digital signal DS corresponding to a ridge of the fingerprint and the magnitude of the digital signal DS corresponding to a valley of the fingerprint may decrease. On the other hand, when the difference DIFF between the first most frequent value MFV1 and the second most frequent value MFV2 is smaller than the second reference value, the current generation circuit 420 may decrease the magnitude of the second rate. In this case, a difference between the magnitude of the digital signal DS corresponding to a ridge of the fingerprint and the magnitude of the digital signal DS corresponding to a valley of the fingerprint may increase.

In some example embodiments, as illustrated in FIG. 12, the current generation circuit 420 may include a current control circuit 421, a first variable current circuit 422, and a second variable current circuit 423.

The first variable current circuit 422 and the second variable current circuit 423 may be coupled between the fourth node N4 and the ground voltage GND in parallel.

The first variable current circuit 422 may generate a first variable current VIC1 based on a first current control signal ICON1 received from the current control circuit 421.

The second variable current circuit 423 may generate a second variable current VIC2 based on a second current control signal ICON2 received from the current control circuit 421.

The current control circuit 421 may receive the phase signal PS and the count enable signal CNT_EN from the controller 500, and receive the digital signal DS from the analog-to-digital converter 300.

During the reset period RST_P in which the phase signal PS has the first logic level, the current control circuit 421 may turn off the second variable current circuit 423 using the second current control signal ICON2, and control the first variable current circuit 422 using the first current control signal ICON1 such that the first variable current circuit 422 may generate the first variable current VIC1, which increases in the second rate determined based on the digital signal DS, while the count enable signal CNT_EN is activated.

During the detection period DT_P in which the phase signal PS has the second logic level, the current control circuit 421 may control the second variable current circuit 423 using the second current control signal ICON2 such that the second variable current circuit 423 may generate the second variable current VIC2 having a magnitude determined based on the digital signal DS, and control the first variable current circuit 422 using the first current control signal ICON1 such that the first variable current circuit 422 may generate the first variable current VIC1, which increases in the second rate, while the count enable signal CNT_EN is activated.

Figure 13:
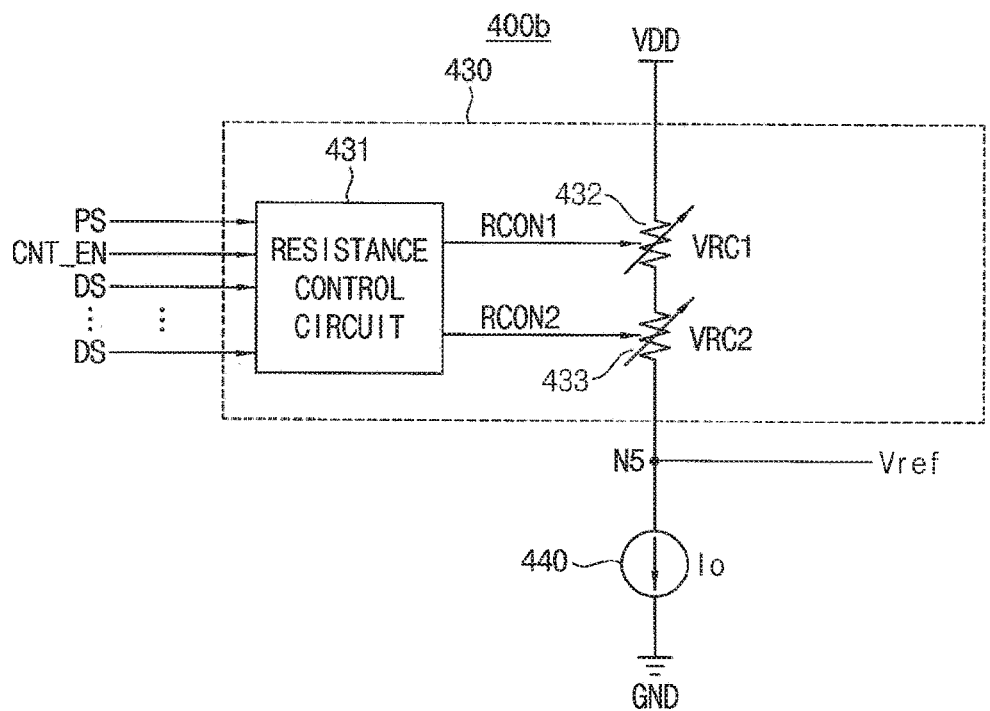
FIG. 13 is a block diagram illustrating another example of a reference signal generator included in the fingerprint sensor of FIG. 1.

FIG. 13 is a block diagram illustrating another example of a reference signal generator included in the fingerprint sensor of FIG. 1.

Referring to FIG. 13, a reference signal generator 400b may include a variable resistor circuit 430 and a static current source 440.

The static current source 440 may be coupled between a fifth node N5 at which the reference signal Vref is output and the ground voltage GND. The static current source 440 may generate a static current Io having a constant magnitude.

The variable resistor circuit 430 may be coupled between the supply voltage VDD and the fifth node N5. The variable resistor circuit 430 may receive the phase signal PS and the count enable signal CNT_EN from the controller 500, and receive the digital signal DS from the analog-to-digital converter 300.

During the reset period RST_P in which the phase signal PS has the first logic level, the variable resistor circuit 430 may provide a reference resistance, which increases in a third rate from a first start resistance, between the supply voltage VDD and the fifth node N5 based on the digital signal DS while the count enable signal CNT_EN is activated. During the detection period DT_P in which the phase signal PS has the second logic level, the variable resistor circuit 430 may provide the reference resistance, which increases in the third rate from a second start resistance greater than the first start resistance, between the supply voltage VDD and the fifth node N5 based on the digital signal DS while the count enable signal CNT_EN is activated.

Therefore, during the reset period RST_P, the reference signal generator 400b may generate the reference signal Vref corresponding to the first start voltage VS1 while the variable resistor circuit 430 provides the reference resistance corresponding to the first start resistance, and the reference signal generator 400b may decrease the magnitude of the reference signal Vref in the first rate a1 while the variable resistor circuit 430 increases the reference resistance in the third rate. During the detection period DT_P, the reference signal generator 400b may generate the reference signal Vref corresponding to the second start voltage VS2, which is lower than the first start voltage VS1, while the variable resistor circuit 430 provides the reference resistance corresponding to the second start resistance, which is greater than the first start resistance, and the reference signal generator 400b may decrease the magnitude of the reference signal Vref in the first rate a1 while the variable resistor circuit 430 increases the reference resistance in the third rate.

In some example embodiments, the variable resistor circuit 430 may determine the first most frequent value MFV1 and the second most frequent value MFV2, which are the two most frequent values among the digital signals DS received from the analog-to-digital converter 300, and calculate the average value AVG by averaging the first most frequent value MFV1 and the second most frequent value MFV2. In some example embodiments, the variable resistor circuit 430 may determine the first most frequent value MFV1 and the second most frequent value MFV2 among the digital signals DS corresponding to one row of the pixel array 100. In other example embodiments, the variable resistor circuit 430 may determine the first most frequent value MFV1 and the second most frequent value MFV2 among the digital signals DS corresponding to one frame of the pixel array 100.

After that, the variable resistor circuit 430 may adjust the magnitude of the second start resistance based on the average value AVG.

For example, when the average value AVG is greater than the first reference value, the variable resistor circuit 430 may increase the magnitude of the second start resistance such that an overall magnitude of the digital signal DS generated by the analog-to-digital converter 300 may be decreased. On the other hand, when the average value AVG is smaller than the first reference value, the variable resistor circuit 430 may decrease the magnitude of the second start resistance such that an overall magnitude of the digital signal DS generated by the analog-to-digital converter 300 may be increased.

In addition, the variable resistor circuit 430 may adjust the magnitude of the third rate based on the difference DIFF between the first most frequent value MFV1 and the second most frequent value MFV2.

For example, when the difference DIFF between the first most frequent value MFV1 and the second most frequent value MFV2 is greater than the second reference value, the variable resistor circuit 430 may increase the magnitude of the third rate. In this case, a difference between the magnitude of the digital signal DS corresponding to a ridge of the fingerprint and the magnitude of the digital signal DS corresponding to a valley of the fingerprint may decrease. On the other hand, when the difference DIFF between the first most frequent value MFV1 and the second most frequent value MFV2 is smaller than the second reference value, the variable resistor circuit 430 may decrease the magnitude of the third rate. In this case, a difference between the magnitude of the digital signal DS corresponding to a ridge of the fingerprint and the magnitude of the digital signal DS corresponding to a valley of the fingerprint may increase.

In some example embodiments, as illustrated in FIG. 13, the variable resistor circuit 430 may include a resistance control circuit 431, a first variable resistor circuit 432, and a second variable resistor circuit 433.

The first variable resistor circuit 432 and the second variable resistor circuit 433 may be coupled between the supply voltage VDD and the fifth node N5 in series.

The first variable resistor circuit 432 may have a first variable resistance VRC1 based on a first resistance control signal RCON1 received from the resistance control circuit 431.

The second variable resistor circuit 433 may have a second variable resistance VRC2 based on a second resistance control signal RCON2 received from the resistance control circuit 431.

The resistance control circuit 431 may receive the phase signal PS and the count enable signal CNT_EN from the controller 500, and receive the digital signal DS from the analog-to-digital converter 300.

During the reset period RST_P in which the phase signal PS has the first logic level, the resistance control circuit 431 may set a resistance of the second variable resistor circuit 433 to zero using the second resistance control signal RCON2, and control the first variable resistor circuit 432 using the first resistance control signal RCON1 such that the first variable resistor circuit 432 may have the first variable resistance VRC1, which increases in the third rate determined based on the digital signal DS, while the count enable signal CNT_EN is activated.

During the detection period DT_P in which the phase signal PS has the second logic level, the resistance control circuit 431 may control the second variable resistor circuit 433 using the second current control signal ICON2 such that the second variable resistor circuit 433 may have the second variable resistance VRC2 having a magnitude determined based on the digital signal DS, and control the first variable resistor circuit 432 using the first resistance control signal RCON1 such that the first variable resistor circuit 432 may have the first variable resistance VRC1, which increases in the third rate, while the count enable signal CNT_EN is activated.

Hereinabove, examples of the reference signal generator 400 included in the fingerprint sensor 10 of FIG. 1 are described with reference to FIGS. 12 and 13. However, example embodiments are not limited thereto. According to example embodiments, the reference signal generator 400 included in the fingerprint sensor 10 of FIG. 1 may have various structures such that the reference signal generator 400 may generate the reference signal Vref decreasing in the first rate a1 from the first start voltage VS1 during the reset period RST_P, generate the reference signal Vref decreasing in the first rate from the second start voltage VS2, which is lower than the first start voltage VS1, during the detection period DT_P, and adjust at least one of the magnitude of the second start voltage VS2 and the magnitude of the first rate a1 based on the magnitude of the digital signal DS generated by the analog-to-digital converter 300.

As described above with reference to FIGS. 1 to 13, in the fingerprint sensor 10 according to example embodiments, the reference signal generator 400 may generate the reference signal Vref decreasing in the first rate a1 from the first start voltage VS1 during the reset period RST_P, and generate the reference signal Vref decreasing in the first rate from the second start voltage VS2, which is lower than the first start voltage VS1, during the detection period DT_P. In addition, the reference signal generator 400 may adjust at least one of the magnitude of the second start voltage VS2 and the magnitude of the first rate a1 based on the magnitude of the digital signal DS generated by the analog-to-digital converter 300.

Therefore, the analog-to-digital converter 300 included in the fingerprint sensor 10 may perform an analog-to-digital conversion operation on the first analog signal AS1 and the second analog signal AS2 with a high resolution to generate the digital signal DS. As such, a resolution of the fingerprint sensor 10 may be effectively increased.

Figure 14:
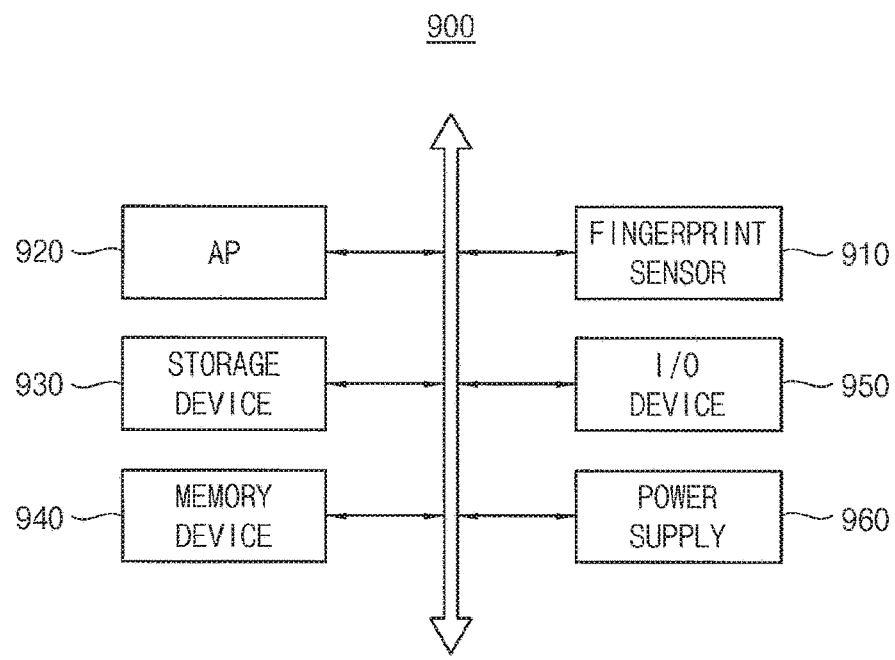
FIG. 14 is a block diagram illustrating an electronic device according to an example embodiment.

FIG. 14 is a block diagram illustrating an electronic device according to an example embodiment.

Referring to FIG. 14, an electronic device 900 includes a fingerprint sensor 910, an application processor (AP) 920, a storage device 930, a memory device 940, an input/output device 950, and a power supply 960. Although it is not illustrated in FIG. 14, the electronic device 900 may further include ports that communicate with a video card, a sound card, a memory card, a universal serial bus (USB) device, or other electronic devices.

The fingerprint sensor 910 detects a fingerprint of a user and generates a digital signal representing the detected fingerprint. For example, the fingerprint sensor 910 may include a plurality of unit pixels generating an analog signal by detecting a fingerprint of a user. The fingerprint sensor 910 may perform an analog-to-digital conversion operation on the analog signal based on a reference signal decreasing in a first rate from a start voltage to generate a digital signal, and adjust a magnitude of the start voltage and a magnitude of the first rate based on the digital signal.

The fingerprint sensor 910 may be implemented as the fingerprint sensor 10 of FIG. 1. A structure and an operation of the fingerprint sensor 10 are described above with reference to FIGS. 1 to 13. Therefore, a detailed description of the fingerprint sensor 910 will be omitted.

The application processor 920 controls overall operations of the electronic device 900. The application processor 920 may execute applications, such as a web browser, a game application, a video player, etc. In some example embodiments, the application processor 920 may include a single core or multiple cores. For example, the application processor 920 may be a multi-core processor, such as a dual-core processor, a quad-core processor, a hexa-core processor, etc. The application processor 920 may include an internal or external cache memory.

The storage device 930 may store a boot image for booting the electronic device 900. For example, the storage device 930 may include a nonvolatile memory device such as a flash memory device, a solid state drive (SSD), etc.

The memory device 940 may store data required for an operation of the electronic device 900. For example, the memory device 940 may include a volatile memory device such as a dynamic random access memory (DRAM), a static random access memory (SRAM), etc.

The input/output device 950 may include an input device such as a touch screen, a keypad, etc., and an output device such as a speaker, a display device, etc. The power supply 960 may supply operational power to the electronic device 900.

In some example embodiments, the application processor 920 may authenticate the user based on the digital signal generated by the fingerprint sensor 910. For example, the storage device 930 may store digital data representing a fingerprint pattern of an allowed user of the electronic device 900. When the application processor 920 receives the digital signal representing a fingerprint pattern of a current user from the fingerprint sensor 910, the application processor 920 may compare the digital signal with the digital data stored in the storage device 930 to determine whether the current user is the allowed user.

In some example embodiments, the electronic device 900 may be arbitrary mobile devices, such as a mobile phone, a smart phone, a personal digital assistant (PDA), a portable multimedia player (PMP), a digital camera, a camcorder, a music player, a portable game console, a navigation system, a laptop computer, etc.

Figure 15:
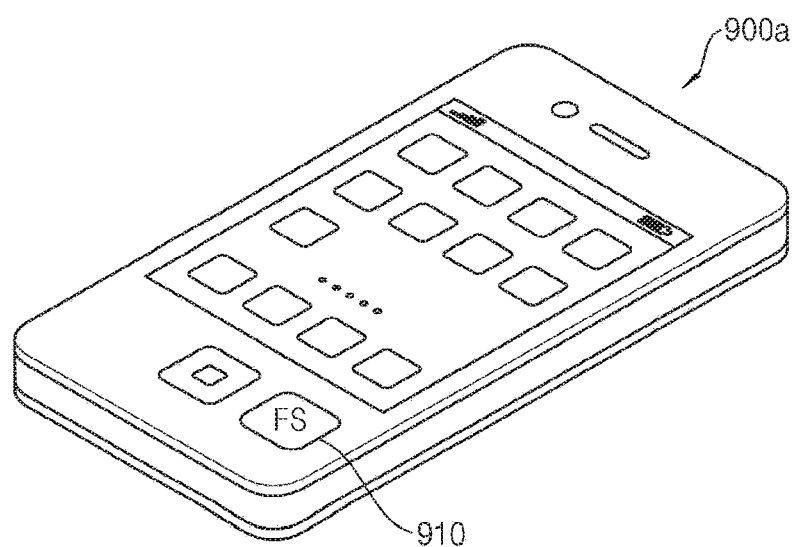
FIG. 15 is a diagram illustrating an example in which the electronic device of FIG. 14 is implemented as a smart phone.

FIG. 15 is a diagram illustrating an example in which the electronic device of FIG. 14 is implemented as a smart phone.

Referring to FIGS. 14 and 15, the fingerprint sensor (FS) 910 included in a smart phone 900a may generate a digital signal representing a fingerprint pattern of a current user by performing operations described above with reference to FIGS. 1 to 13.

The application processor 920 may determine whether the current user is an allowed user based on whether the digital signal received from the fingerprint sensor 910 is the same as the digital data stored in the storage device 930.

Although the fingerprint sensor 910 is located at a bottom part of a front face of the smart phone 900a in FIG. 15, example embodiments are not limited thereto. According to example embodiments, the fingerprint sensor 910 may be located at any part of the smart phone 900a.

The foregoing is illustrative of inventive concepts and is not to be construed as limiting thereof. Although a few example embodiments have been described, those skilled in the art will readily appreciate that many modifications are possible in the example embodiments without materially departing from the novel teachings and advantages of inventive concepts. Accordingly, all such modifications are intended to be included within the scope of inventive concepts as defined in the claims. Therefore, it is to be understood that the foregoing is illustrative of various example embodiments and is not to be construed as limited to example embodiments disclosed, and that modifications to the disclosed example embodiments, as well as other example embodiments, are intended to be included within the scope of the appended claims.

What is claimed is:

1. A fingerprint sensor device, comprising:
a pixel array including a plurality of unit pixels arranged in rows and columns, each of the plurality of unit pixels being configured to generate an analog signal by detecting a fingerprint of a user;
an analog-to-digital converter configured to perform an analog-to-digital conversion operation on the analog signal to generate a digital signal, the analog-to-digital converter configured to perform the analog-to-digital conversion based on a reference signal; and
a reference signal generator configured to generate the reference signal such that the reference signal decreases at a first rate from a start voltage, the reference signal generator being configured to adjust a magnitude of the start voltage based on the digital signal,
wherein each of the plurality of unit pixels generates a first analog signal corresponding to a reset component during a reset period and generates a second analog signal corresponding to the fingerprint of the user during a detection period, and
the analog-to-digital converter generates the digital signal by performing a correlated double sampling (CDS) operation on the first analog signal and the second analog signal based on the reference signal,
wherein the reference signal generator,
generates the reference signal such that the reference signal decreases at the first rate from a first start voltage during the reset period, and
generates the reference signal such that the reference signal decreases at the first rate from a second start voltage during the detection period, the second start voltage being lower than the first start voltage, and
wherein the digital signal is a plurality of digital signals and the reference signal generator is configured to,
calculate an average value based on the digital signals received from the analog-to-digital converter,
decrease a magnitude of the second start voltage when the average value is greater than a first reference value, and
increase the magnitude of the second start voltage when the average value is smaller than the first reference value.

2. A fingerprint sensor device, comprising:
a pixel array including a plurality of unit pixels arranged in rows and columns, each of the plurality of unit pixels being configured to generate an analog signal by detecting a fingerprint of a user;
an analog-to-digital converter configured to perform an analog-to-digital conversion operation on the analog signal to generate a digital signal, the analog-to-digital converter configured to perform the analog-to-digital conversion based on a reference signal; and
a reference signal generator configured to generate the reference signal such that the reference signal decreases at a first rate from a start voltage, the reference signal generator being configured to adjust a magnitude of the start voltage based on the digital signal,
wherein each of the plurality of unit pixels generates a first analog signal corresponding to a reset component during a reset period and generates a second analog signal corresponding to the fingerprint of the user during a detection period, and
the analog-to-digital converter generates the digital signal by performing a correlated double sampling (CDS) operation on the first analog signal and the second analog signal based on the reference signal,
wherein the reference signal generator,
generates the reference signal such that the reference signal decreases at the first rate from a first start voltage during the reset period, and
generates the reference signal such that the reference signal decreases at the first rate from a second start voltage during the detection period, the second start voltage being lower than the first start voltage, wherein the digital signal is a plurality of digital signals and the reference signal generator is configured to, determine a first most frequent value and a second most frequent value, the first most frequent value is the most frequent value among the digital signals and the second most frequent value is the second most frequent value among the digital signals, and adjust the magnitude of the first rate based on a difference between the first most frequent value and the second most frequent value.

3. The fingerprint sensor device of claim 2, wherein the reference signal generator, increases the magnitude of the first rate when the difference between the first most frequent value and the second most frequent value is greater than a second reference value, and decreases the magnitude of the first rate when the difference between the first most frequent value and the second most frequent value is smaller than the second reference value.

4. The fingerprint sensor device of claim 2, wherein the reference signal generator includes:

a reference resistor coupled between a supply voltage source and a first node, the first node being a location at which the reference signal is output; and a current generation circuit coupled between the first node and a ground voltage source, the current generation circuit being configured to generate a reference current such that the reference current increases at a second rate from a first start current while a count enable signal is activated in the reset period, the current generation circuit being configured to generate the reference current based on the digital signal, and the current generation circuit further configured to generate the reference current such that the reference current increases at the second rate from a second start current while the count enable signal is activated in the detection period, the second start current being greater than the first start current.

5. The fingerprint sensor device of claim 4, wherein the digital signal is a plurality of digital signals and the current generation circuit is configured to, determine a first most frequent value and a second most frequent value, the first most frequent value is the most frequent value among the digital signals and the second most frequent value is the second most frequent value among the digital signals, calculate an average value by averaging the first most frequent value and the second most frequent value, increase a magnitude of the second start current when the average value is greater than a first reference value, and decrease the magnitude of the second start current when the average value is smaller than the first reference value.

6. The fingerprint sensor device of claim 4, wherein the digital signal is a plurality of digital signals and the current generation circuit is configured to, determine a first most frequent value and a second most frequent value, the first most frequent value is the most frequent value among the digital signals and the second most frequent value is the second most frequent value among the digital signals, increase a magnitude of the second rate when a difference between the first most frequent value and the second most frequent value is greater than a second reference value, and decrease the magnitude of the second rate when the difference between the first most frequent value and the second most frequent value is smaller than the second reference value.

7. The fingerprint sensor device of claim 2, wherein the reference signal generator includes:

a variable resistor circuit coupled between a supply voltage source and a first node, the first node being a location at which the reference signal is output, the variable resistor circuit being configured to provide a reference resistance such that the reference resistance increases at a third rate from a first start resistance while a count enable signal is activated in the reset period, the variable resistor circuit being configured to provide the reference resistance based on the digital signal, and the variable resistor circuit being configured to provide the reference resistance such that the reference resistance increases at the third rate from a second start resistance while the count enable signal is activated in the detection period, the second start resistance is greater than the first start resistance; and a static current source coupled between the first node and a ground voltage source, the static current source being configured to generate a static current having a constant magnitude.

8. The fingerprint sensor device of claim 1, wherein the reference signal generator is configured to, calculate the average value by averaging values of selected digital signals of the digital signals, the selected digital signals corresponding to one row of the pixel array.

9. The fingerprint sensor device of claim 1, wherein the reference signal generator is configured to, calculate the average value by averaging values of selected digital signals of the digital signals, the selected digital signals corresponding to one frame of the pixel array.

10. The fingerprint sensor device of claim 1, wherein the reference signal generator is configured to, determine a first most frequent value and a second most frequent value, the first most frequent value is the most frequent value among the digital signals and the second most frequent value is the second most frequent value among the digital signals, and calculate the average value by averaging the first most frequent value and the second most frequent value.

11. An electronic device, comprising:

a fingerprint sensor including a plurality of unit pixels, each of the plurality of unit pixels is configured to generate an analog signal by detecting a fingerprint of a user, the fingerprint sensor being configured to perform an analog-to-digital conversion operation on the analog signal to generate a digital signal, the analog-to-digital conversion being based on a reference signal that decreases at a first rate from a start voltage, and the fingerprint sensor is configured to adjust a magnitude of the start voltage based on the digital signal and a magnitude of the first rate based on the digital signal; and an application processor configured to authenticate the user based on the digital signal, wherein the fingerprint sensor includes a reference signal generator configured to generate the reference signal, and wherein the digital signal is a plurality of digital signals and the reference signal generator is configured to, determine a first most frequent value and a second most frequent value, the first most frequent value is the most frequent value among the digital signals and the second most frequent value is the second most frequent value among the digital signals, and adjust the magnitude of the first rate based on a difference between the first most frequent value and the second most frequent value.

* * * * *